(12) United States Patent
Urakawa

(10) Patent No.: US 11,438,470 B2
(45) Date of Patent: Sep. 6, 2022

(54) IMAGE FORMING APPARATUS, METHOD, AND COMPUTER-READABLE MEDIUM FOR REDUCING PROCESSING LOAD TO DISPLAY ANIMATION DURING REMOTE CONTROL

(71) Applicant: BROTHER KOGYO KABUSHIKI KAISHA, Nagoya (JP)

(72) Inventor: Yutaka Urakawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/191,947

(22) Filed: Mar. 4, 2021

(65) Prior Publication Data
US 2021/0306484 A1  Sep. 30, 2021

(30) Foreign Application Priority Data
Mar. 31, 2020 (JP) .............................. JP2020-062619

(51) Int. Cl.
*H04N 1/00* (2006.01)
(52) U.S. Cl.
CPC ....... *H04N 1/00408* (2013.01); *H04N 1/0049* (2013.01); *H04N 1/00127* (2013.01); *H04N 2201/0094* (2013.01)
(58) Field of Classification Search
None
See application file for complete search history.

(56) References Cited

U.S. PATENT DOCUMENTS

| 2012/0069393 | A1* | 3/2012 | Shoji | H04N 1/00448 358/1.15 |
| 2014/0085668 | A1* | 3/2014 | Ishii | G06F 3/0481 358/1.15 |
| 2014/0289676 | A1* | 9/2014 | Yoritate | H04N 1/00448 715/830 |

FOREIGN PATENT DOCUMENTS

JP   2020-010265 A   1/2020

* cited by examiner

*Primary Examiner* — Frantz Bataille
(74) *Attorney, Agent, or Firm* — Scully, Scott, Murphy & Presser, PC

(57) ABSTRACT

An image forming apparatus includes at least one of a print engine and a scan engine, a communication interface, a display, and a controller configured to perform at least one of controlling the print engine to perform printing and controlling the display to display a status of the printing, and controlling the scan engine to perform image scanning and controlling the display to display a status of the image scanning. The controller is further configured to sequentially switch a target image to be displayed from one still image to another among a plurality of still images constituting an animation, thereby displaying the animation on the display, and change a manner to display the animation when the image forming apparatus is remotely connected with an information processing device.

20 Claims, 17 Drawing Sheets

IMAGE FORMING APPARATUS, METHOD, AND COMPUTER-READABLE MEDIUM FOR REDUCING PROCESSING LOAD TO DISPLAY ANIMATION DURING REMOTE CONTROL

CROSS-REFERENCE TO RELATED APPLICATION

This application claims priority under 35 U.S.C. § 119 from Japanese Patent Application No. 2020-062619 filed on Mar. 31, 2020. The entire subject matter of the application is incorporated herein by reference.

BACKGROUND

Technical Field

Aspects of the present disclosure are related to an image forming apparatus, a method, and a non-transitory computer-readable medium for reducing a processing load to display an animation during remote control of the image forming apparatus.

Related Art

A system has been known in which, when an image forming apparatus is remotely connected with an information processing terminal, the information processing terminal obtains screen data from the image forming apparatus, and based on the obtained screen data, displays a screen with substantially the same contents as displayed on the image forming apparatus.

SUMMARY

However, in the known system, when an animation is displayed on the image forming apparatus, the image forming apparatus needs to repeatedly generate and transmit, to the information processing terminal, screen data of individual still images constituting the animation at short time intervals. Therefore, a CPU of the image forming apparatus has to bear thereon an excessively large processing load. Consequently, the image forming apparatus might be unable to display the animation with a natural motion as it should be, or might respond to a request for obtainment of the screen data from the information processing terminal in a delayed fashion.

Aspects of the present disclosure are advantageous to provide one or more improved techniques, for an image forming apparatus remotely connected with an information processing terminal, which make it possible to prevent an excessively large load on a CPU of the image forming apparatus even when an animation is displayed on the image forming apparatus.

According to aspects of the present disclosure, an image forming apparatus is provided, which includes at least one of a print engine and a scan engine, a communication interface, a display, and a controller. The controller is configured to perform at least one of controlling the print engine to perform printing and controlling the display to display a status of the printing, and controlling the scan engine to perform image scanning and controlling the display to display a status of the image scanning. The controller is further configured to sequentially switch a target image to be displayed from one still image to another among a plurality of still images constituting an animation, thereby displaying the animation on the display, and change a manner to display the animation when the image forming apparatus is remotely connected with an information processing device.

According to aspects of the present disclosure, further provided is a method implementable on a processor of an image forming apparatus including at least one of a print engine and a scan engine, a communication interface, and a display. The method includes performing at least one of controlling the print engine to perform printing and controlling the display to display a status of the printing, and controlling the scan engine to perform image scanning and controlling the display to display a status of the image scanning. The method further includes sequentially switching a target image to be displayed from one still image to another among a plurality of still images constituting an animation, thereby displaying the animation on the display, and changing a manner to display the animation when the image forming apparatus is remotely connected with an information processing device.

According to aspects of the present disclosure, further provided is a non-transitory computer-readable medium storing computer-readable instructions executable by a processor of an image forming apparatus including at least one of a print engine and a scan engine, a communication interface, and a display. The instructions are configured to, when executed by the processor, cause the processor to perform at least one of controlling the print engine to perform printing and controlling the display to display a status of the printing, and controlling the scan engine to perform image scanning and controlling the display to display a status of the image scanning. The instructions are further configured to, when executed by the processor, cause the processor to sequentially switch a target image to be displayed from one still image to another among a plurality of still images constituting an animation, thereby displaying the animation on the display, and change a manner to display the animation when the image forming apparatus is remotely connected with an information processing device.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

Figure 1:
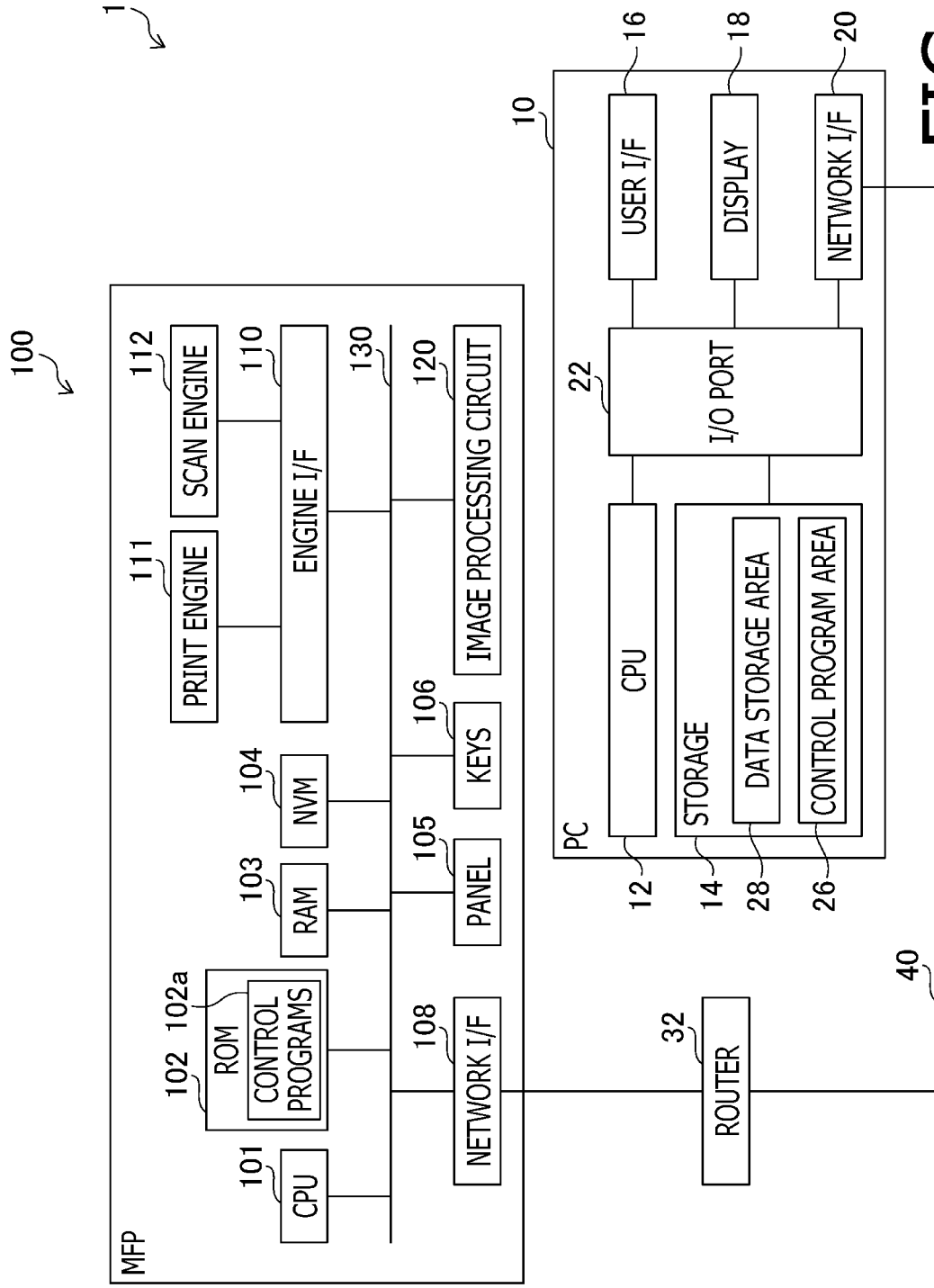
FIG. 1 is a block diagram showing a control configuration of an image forming system including a PC and an MFP, in an illustrative embodiment according to one or more aspects of the present disclosure.

FIG. 1 is a block diagram showing a control configuration of an image forming system 1 in an illustrative embodiment. As shown in FIG. 1, the image forming system 1 includes a PC 10, an MFP ("MFP" is an abbreviation for "Multi-Function Peripheral") 100 and a router 32.

The PC 10 includes a CPU 12, a storage 14, a user I/F ("I/F" is an abbreviation for "interface") 16, a display 18, and a network I/F 20. The CPU 12, the storage 14, the user I/F 16, the display 18, and the network I/F 20 are communicably interconnected via an I/O ("I/O" is an abbreviation for "input-output") port 22.

Typically, the user I/F 16 may include a keyboard and a mouse.

The display 18 includes a display device such as a liquid crystal display or an organic electroluminescence display, and a drive circuit for driving the display device. When a touch panel type display is used as the display 18, a user is allowed to perform input operations by touching input buttons on a screen of the display 18. Therefore, in this case, the display 18 also serves as the user IF 16.

The CPU 12 is configured to execute various application programs (hereinafter, which may be simply referred to as "applications") including a program for a main process that will be described below with reference to FIG. 4, and execute firmware.

The storage 14 includes a ROM, a RAM, an HDD, an SSD and an optical disk drive. The storage 14 has a data storage area 28 and a control program area 26. The data storage area 28 is an area for storing data necessary for the CPU 12 to execute applications such as the program for the main process. The control program area 26 is an area for storing an OS, the program for the main process, various other applications, and the firmware.

The network I/F 20 is configured to connect the PC 10 with a communication network 40. The communication network 40 may be a wired LAN or a wireless LAN. The network I/F 20 may include one or both of a LAN I/F and a WLAN I/F. In the illustrative embodiment, the communication network 40 is connected with the router 32 and the MFP 100. Therefore, the PC 10 is enabled to communicate various types of data with the MFP 100 via the router 32.

The MFP 100 includes a CPU 101, a ROM 102, a RAM 103, and an NVM ("NVM" is an abbreviation for "Non-Volatile Memory") 104.

The CPU 101 is configured to control the entire MFP 100. Specifically, for instance, the CPU 101 controls a print engine 111 and a scan engine 112 via an engine I/F 110.

The ROM 102 is configured to store control programs 102a (including a program for a main process that will be described below with reference to FIGS. 8A and 8B) to be executed by the CPU 101. The CPU 101 reads out the control programs 102a stored in the ROM 102 and executes various processes. The RAM 103 is configured to temporarily store various types of data such as image data. The RAM 103 is also used as a storage area to temporarily store data and signals used when the CPU 101 executes the control programs 102a, or as a work area for data processing. The NVM 104 is a non-volatile memory configured to store various types of information such as setting information.

The MFP 100 further includes a panel 105 and keys 106. In the illustrative embodiment, the panel 105 is a touch panel. The panel 105 is configured to display thereon various screens depending on states of the MFP 100. The user may perform input operations by touching input buttons on a screen. In the present disclosure, "touching input buttons on a screen" may also be expressed as "pressing input buttons on a screen." The keys 106 are hard keys, i.e., keys formed by hardware. The keys 106 may include, but are not limited to, a power switch, a reset switch, and a numeric.

The MFP 100 further includes a network I/F 108. The network I/F 108 is configured in substantially the same manner as the network I/F 20 of the PC 10. Thus, as described above, the MFP 100 is enabled to communicate various types of data with the PC 10.

The MFP 100 further includes the engine I/F 110. The engine I/F 110 is connected with the print engine 111 and the scan engine 112. The print engine 111 is configured to print an image on a sheet. The print engine 111 includes a printing device such as an electrophotographic printing device, an inkjet printing device or a thermal printing device. The scan engine 112 is configured to scan an image from a document. The scan engine 112 includes an image sensor such as a CCD or a CIS. The engine I/F 110 is an interface configured to control the print engine 111 and the scan engine 112.

The MFP 100 further includes an image processing circuit 120. The image processing circuit 120 is configured to rasterize image data concerning the print job and output the rasterized image data to the print engine 111. The image processing circuit 120 is further configured to process and convert image data scanned from a document by the scan engine 112 into digital data. The digital data obtained by processing the scanned image data may be transmitted externally via the network I/F 307 or may be supplied to the print engine 111 and then output as an image printed on a sheet.

The CPU 101, the ROM 102, the RAM 103, the NVM 104, the panel 105, the keys 106, the USB I/F 107, the network I/F 108, the engine I/F 110 and the image processing circuit 120 are interconnected via a bus 130.

Figure 2A:
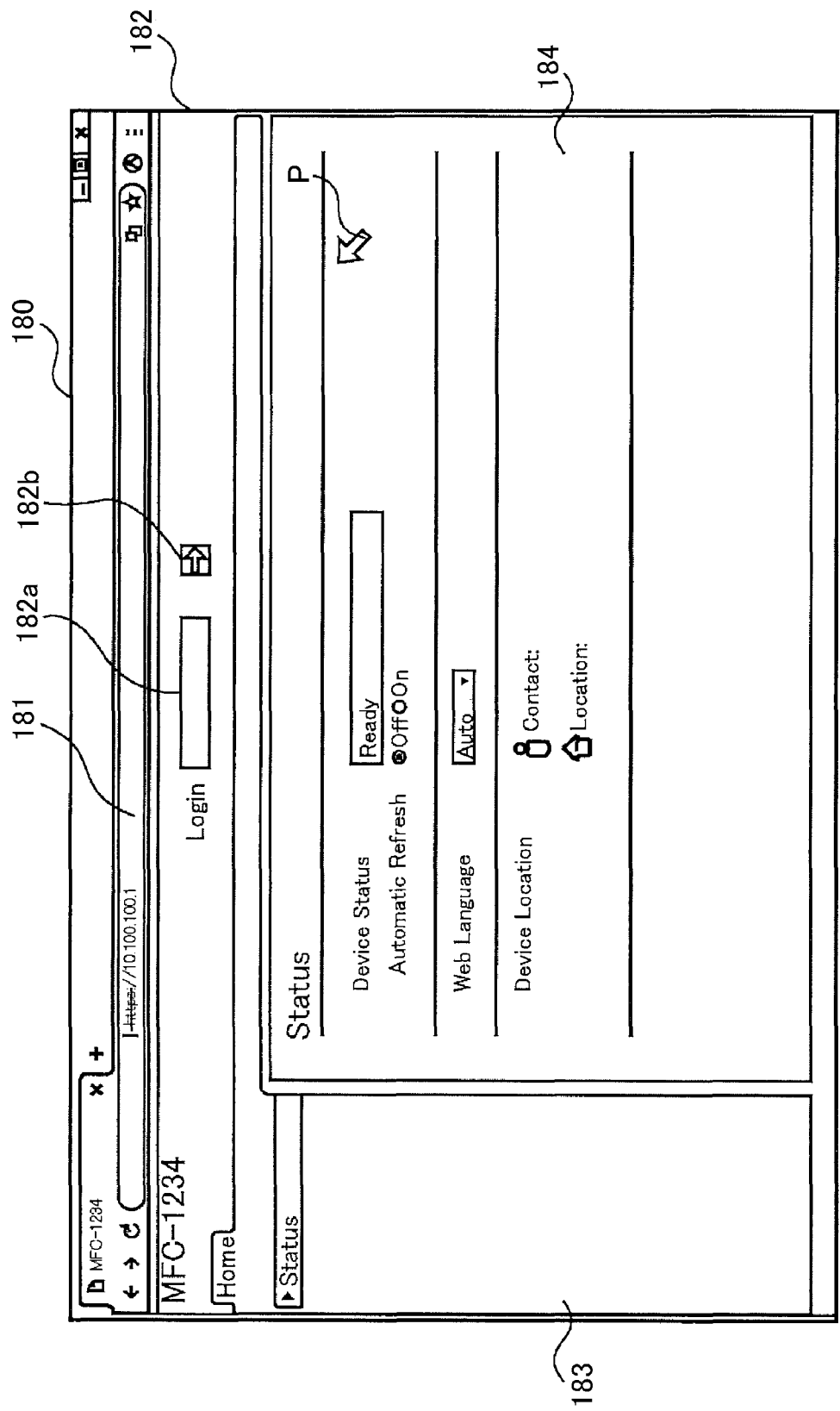
FIGS. 2A and 2B show examples of a display screen on a browser executed on the PC, in the illustrative embodiment according to one or more aspects of the present disclosure.

FIG. 2A shows an example of a browser screen 180 that is displayed on the display 18 when the user launches a browser on the PC 10 and inputs a URL "10.100.100.1" in a URL entry field 181. The input URL "10.100.100.1" indicates a storage location of an EWS ("EWS" is an abbreviation for "Embedded Web Server") that is one of the control programs 102*a* of the MFP 100.

In a page display area 182 of the browser screen 180, pages provided by the EWS are displayed. Each page provided by the EWS includes an item pane 183 and a detail pane 184. The page shown in FIG. 2A is an initial page provided by the EWS. When the user enters a password in a login password entry field 182*a* on the initial page and clicks a login button 182*b* with a mouse pointer P, the user is allowed to log in to a function setting page provided by the EWS that is for setting various functions of the MFP 100.

Figure 2B:
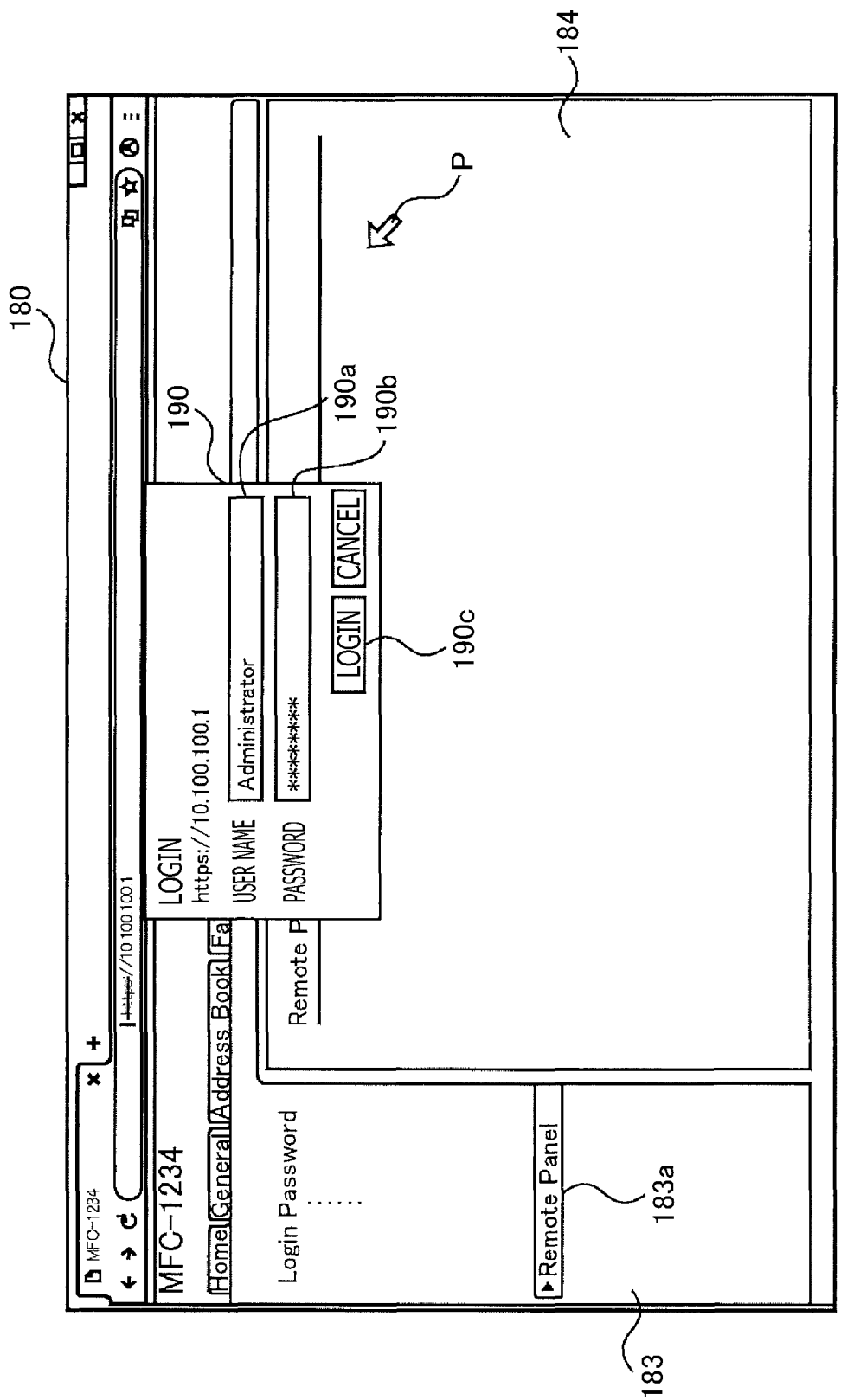

FIG. 2B shows an example of the browser screen 180 that is displayed when a "Remote Panel" item 183*a*, among a plurality of items listed in the item pane 183 on the function setting page, is clicked. "Remote Panel" item 183*a* is an item for displaying "Remote Panel" in the detail pane 184. In the example of the browser screen 180 shown in FIG. 2B, a login authentication screen 190 for login authentication to log in to the "Remote Panel" is displayed in a pop-up manner. The following provides a reason why the login authentication is performed before displaying the "Remote Panel."

The "Remote Panel" is a virtual screen that is virtually generated as a screen on a panel of a remotely-connected device in order to remotely access the device. Therefore, when an input operation is performed on the "Remote Panel" displayed in the detail pane 184, substantially the same input operation is performed on the panel of the remotely accessed device. Specifically, in the illustrative embodiment, substantially the same input operation may be performed on the panel 105 of the MFP 100. Thus, by displaying the "Remote Panel" on the PC 10, a third party is allowed to freely and remotely access the MFP 100 from the outside via the PC 10. Therefore, it is necessary to restrict users authorized to display the "Remote Panel." For this reason, even after logging in to the function setting page, further login authentication is required to display the "Remote Panel."

Figure 2C:
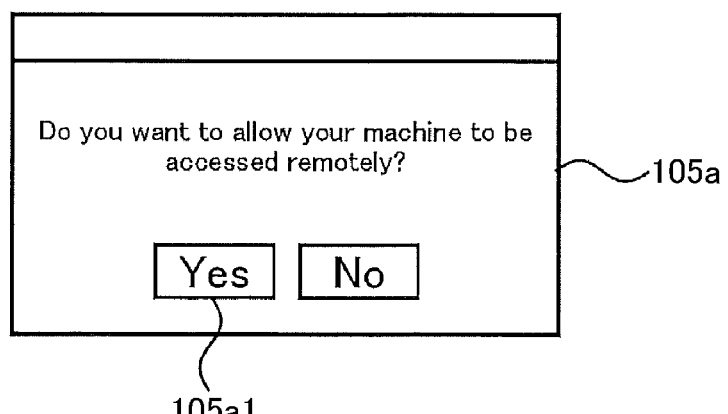
FIG. 2C shows an example of a display screen on a panel of the MFP, in the illustrative embodiment according to one or more aspects of the present disclosure.

The users authorized to log in to the "Remote Panel" are limited to administrators having administrative privileges. Therefore, a user (e.g., an administrator) who attempts to log in to the "Remote Panel" is required to input an administrator name (e.g., "Administrator") in a user name entry field 190*a* on the login authentication screen 190 and input an administrator password in a password entry field 190*b*. Then, when the said user clicks a login button 190*c* with the mouse pointer P, a checking screen 105*a* for checking whether the MFP 100 is allowed to be remotely controlled is displayed on the panel 105 of the MFP 100, as shown in FIG. 2C. When a user of the MFP 100 presses a "Yes" button 105*a*1 on the checking screen 105*a*, the "Remote Panel" is displayed in the detail pane 184.

Figure 3:
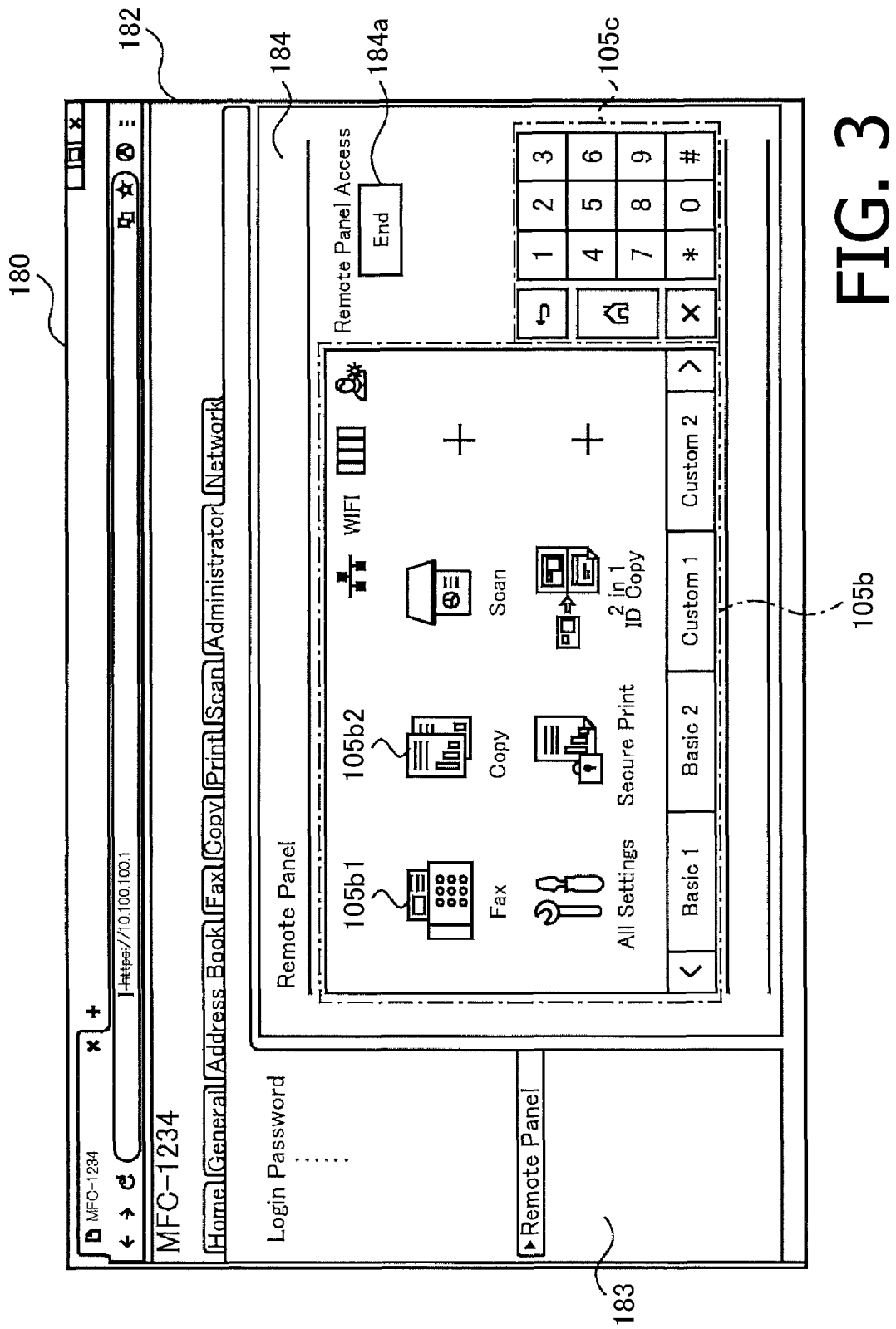
FIG. 3 shows an example of a "Remote Panel" after a transition from the display screen on the browser as shown in FIG. 2B, in the illustrative embodiment according to one or more aspects of the present disclosure.

FIG. 3 shows an example of the "Remote Panel" displayed in the detail pane 184. The "Remote Panel" in the illustrated example includes a panel display 105*b* that is the same as displayed on the panel 105 of the MFP 100 and a key display 105*c* that virtually shows the keys 106 of the MFP 100. Display data for displaying the "Remote Panel" is obtained from the EWS. As described above, the EWS is software. Therefore, "obtained from the EWS" strictly denotes "obtained from the MFP 100 when the CPU 101 of the MFP 100 is executing the EWS." Nonetheless, in the following description as well, "obtained from the MFP 100 when the CPU 101 of the MFP 100 is executing the EWS" may be simply expressed as "obtained from the EWS" in an abbreviated manner.

The "Remote Panel" further includes an End button 184*a* displayed thereon, which is a button for closing the "Remote Panel." The administrator may terminate the "Remote Panel" by clicking the End button 184*a*.

FIGS. 4A to 4D show examples of panel displays 105*d* to 105*e*' on the panel 105 of MFP 100, in particular, a specific example of an animation displayed on panel 105.

Figure 4B:
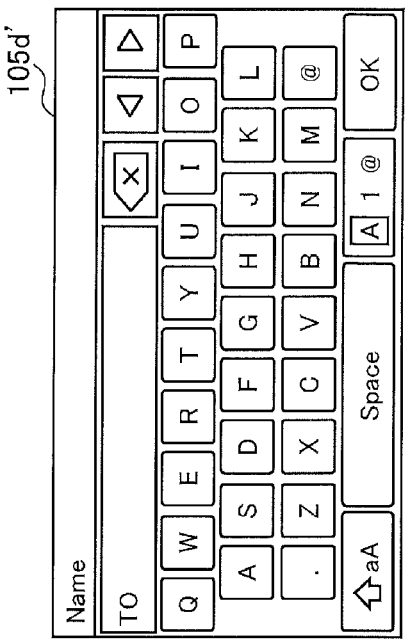
FIGS. 4A and 4B show examples of still images constituting an animation of a blinking cursor on the panel of the MFP, in the illustrative embodiment according to one or more aspects of the present disclosure.
Figure 4D:
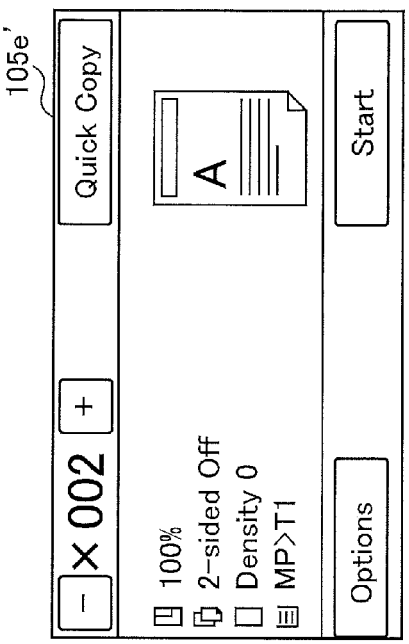
FIGS. 4C and 4D show examples of still images constituting another animation of a blinking cursor on the panel of the MFP, in the illustrative embodiment according to one or more aspects of the present disclosure.
Figure 4A:
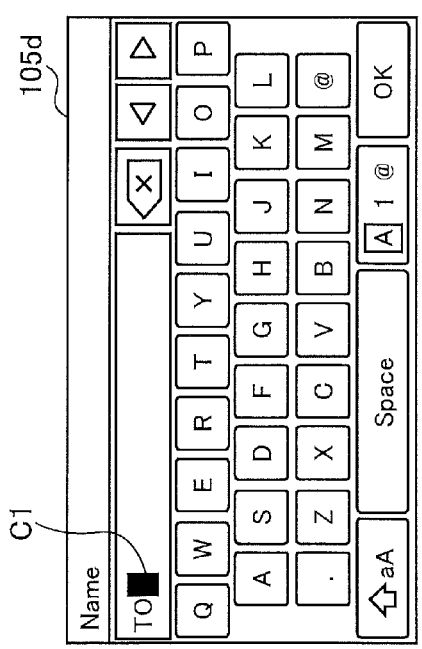

FIG. 4A shows a text entry screen 105*d* after the MFP 100 has made a transition to a Fax mode in response to a "Fax" icon 105*b*1 on the panel display 105*b* shown in FIG. 3 being pressed. FIG. 4B shows a text entry screen 105*d*'. A difference between the text entry screen 105*d* shown in FIG. 4A and the text entry screen 105*d*' shown in FIG. 4B is that the text entry screen 105*d* shows thereon a cursor C1 in a text entry position, whereas the text entry screen 105*d*' does not show the cursor C1. The cursor C1 is normally displayed in a blinking manner. Hence, in a normal state, the text entry screen 105*d* with the cursor C1 displayed thereon and the text entry screen 105*d*' without the cursor C1 are displayed alternately and repeatedly.

Figure 4C:
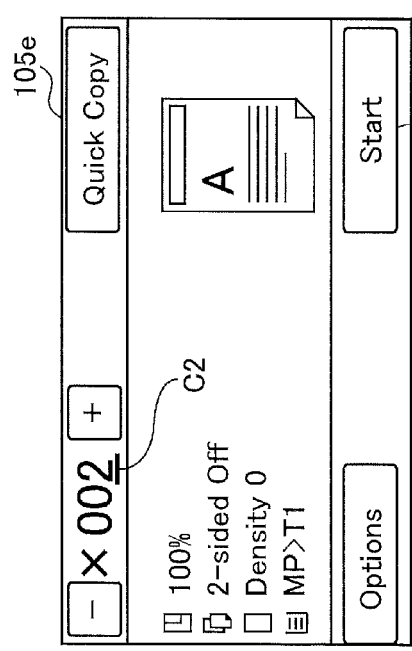

FIG. 4C shows a copy screen 105e after the MFP 100 has made a transition to a Copy mode in response to a "Copy" icon 105b2 on the panel display 105b shown in FIG. 3 being pressed. FIG. 4D shows a copy screen 105e'. A difference between the copy screen 105e shown in FIG. 4C and the copy screen 105e' shown in FIG. 4D is that the copy screen 105e shows thereon a cursor C2 displayed in a number-of-copies entry position, whereas the copy screen 105e' does not show the cursor C2. The cursor C2 is also normally displayed in a blinking manner. Hence, in a normal state, the copy screen 105e with the cursor C2 displayed thereon and the copy screen 105e' without the cursor C2 are displayed alternately and repeatedly.

The blinking display of the cursor C1 is an animation realized by alternately displaying a still image with the cursor C1 turned on and a still image with the cursor C1 turned off. It is noted that substantially the same applies to the cursor C2.

Figure 5A:
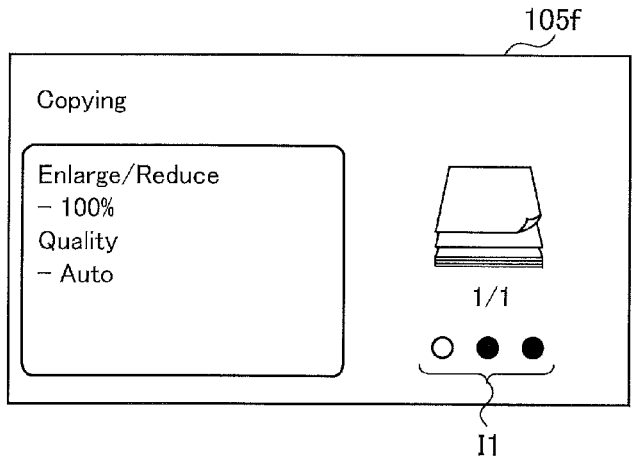
FIGS. 5A to 5C show examples of copy-in-progress displays shown on the panel of the MFP as an animation realized by sequentially switching a target image to be displayed from one still image to another among respective still images of the copy-in-progress displays, in the illustrative embodiment according to one or more aspects of the present disclosure.
Figure 5B:
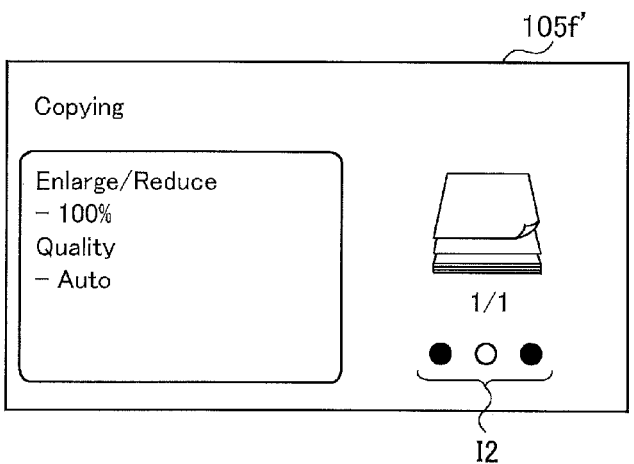
Figure 5C:
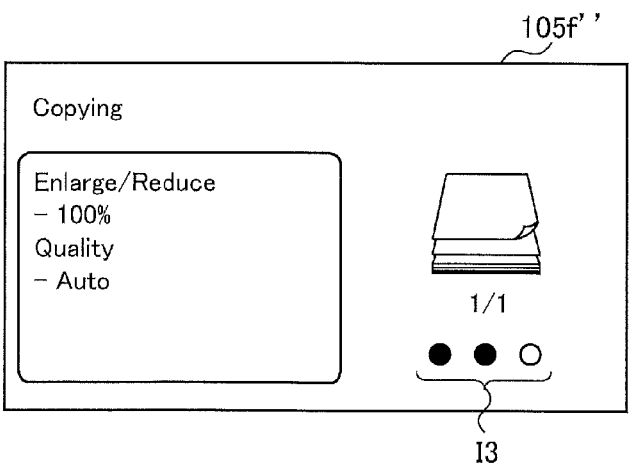

FIGS. 5A to 5C show examples of copy-in-progress screens 105f to 105f" to be displayed when a "Start" button 105e1 on the copy screen 105e is pressed. On the copy-in-progress screens 105f to 105f", copy-in-progress displays I1 to I3 representing that copying is in progress are shown, respectively. Specifically, the copy-in-progress displays I1 to I3 represent that the copying is in progress, by one white circle moving while changing its position among three circles. The copy-in-progress displays I1 to I3 are shown as an animation realized by sequentially switching a target image to be displayed from one still image to another among respective three still images of the copy-in-progress displays I1 to I3. The three still images include a still image (see FIG. 5A) with the white circle located at the left one of the three circles, a still image (see FIG. 5B) with the white circle located at the middle one of the three circles, and a still image (see FIG. 5C) with the white circle located at the right one of the three circles.

Figure 17:
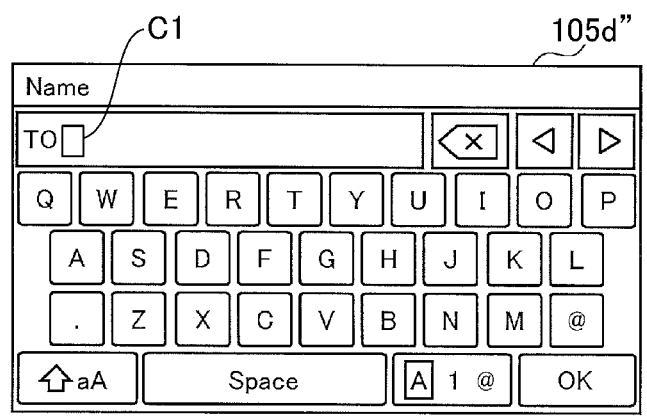
FIG. 17 shows an example of a still image constituting an animation of a cursor displayed while switching a display mode therefor between a first display mode shown in FIG. 4A and a second display mode shown in this figure, in a modification according to one or more aspects of the present disclosure.

The MFP 100 of the illustrative embodiment changes how to display the animation depending on whether the "Remote Panel" is displayed on the PC 10 side. Specifically, with respect to the blinking display of the cursor C1, when the "Remote Panel" is not displayed on the PC 10 side, the cursor C1 is displayed blinking as normal (see FIGS. 4A and 4B). In another instance, in this case, the cursor C1 may be displayed while switching a display mode therefor between a first display mode and a second display mode, instead of being displayed in the blinking manner. In the first display mode, the cursor C1 may be displayed as a filled rectangular area, as shown in FIG. 4A. Meanwhile, in the second display mode, the cursor C1 may be displayed as an outlined (i.e., unfilled) rectangular area, as shown in FIG. 17. On the other hand, when the "Remote Panel" is displayed on the PC 10, the cursor C1 is not displayed in the blinking manner, but is displayed only with the cursor C1 turned on. Namely, in this case, for instance, only the text entry screen 105d (see FIG. 4A) may be displayed on which the cursor C1 is turned on to appear as the filled rectangular area. In another instance, in this case, only a text entry screen 105d" (see FIG. 17) may be displayed on which the cursor C1 is turned on to appear as the outlined rectangular area. In yet another instance, in this case, only the text entry screen 105d' (see FIG. 4B) may be displayed on which the cursor C1 is turned off. It is noted that substantially the same may apply to the blinking display of the cursor C2.

Further, with respect to the transitional display of the copy-in-progress displays I1 to I3, when the "Remote Panel" is not displayed on the PC10 side, the copy-in-progress displays I1 to I3 are displayed to switch from one still image to another among their respective still images at intervals of a normal switching period (e.g., 0.5 seconds). On the other hand, when the "Remote Panel" is displayed on the PC10 side, the copy-in-progress displays I1 to I3 are displayed to switch from one still image to another among their respective still images at intervals of a period (e.g., 1 second) longer than the normal switching period. It is noted that, with respect to the blinking display of the cursor C1 as well, when the "Remote Panel" is displayed on the PC10 side, the cursor C1 may be displayed blinking at time intervals longer than when the "Remote Panel" is not displayed on the PC10 side, in a similar manner to the copy-in-progress displays I1 to I3. The same may apply to the blinking display of the cursor C2.

When the display control for animations as described above is performed, if the "Remote Panel" is displayed on the PC 10 side, since the panel display 105b on the "Remote Panel" is the same as the panel display 105b on the panel 105 of the MFP 100, the panel display 105b on the "Remote Panel" also shows animations under the display control. Specifically, the panel display 105b on the "Remote Panel" may show the cursors C1 and C2 to be kept turned on, or to blink, for instance, at intervals of 1 second. Further, the panel display 105b on the "Remote Panel" may show the copy-in-progress displays I1 to I3 to sequentially switch from one still image to another (e.g., from the copy-in-progress display I1 to the copy-in-progress display I2, from the copy-in-progress display I2 to the copy-in-progress display I3, or from the copy-in-progress display I3 to the copy-in-progress display I1) among their respective still images, for instance, at intervals of 1 second.

The display control for animations as described above is performed for the following reason. That is, in a case where the CPU 101 of the MFP 100 controls the panel 105 to display the panel display 105b when the "Remote Panel" is displayed on the PC 10 side, the CPU 101 has to generate screen data representing the panel display 105b and display the panel display 105b on the panel 105, and additionally has to generate and send, to the PC 10, the same screen data as the panel display 105b. Therefore, in this case, it is necessary to reduce the load on the CPU 101 because the load on the CPU 101 may become so large as to cause delays in other processes. Therefore, when the "Remote Panel" is displayed on the PC 10 side, the CPU 101 performs the display control for animations, thereby reducing the load on the CPU 101 and preventing prevent the load on the CPU 101 from becoming excessively large.

Hereinafter, control processing by the image forming system 1 configured as above will be described in detail with reference to FIGS. 6 to 16.

Figure 6:
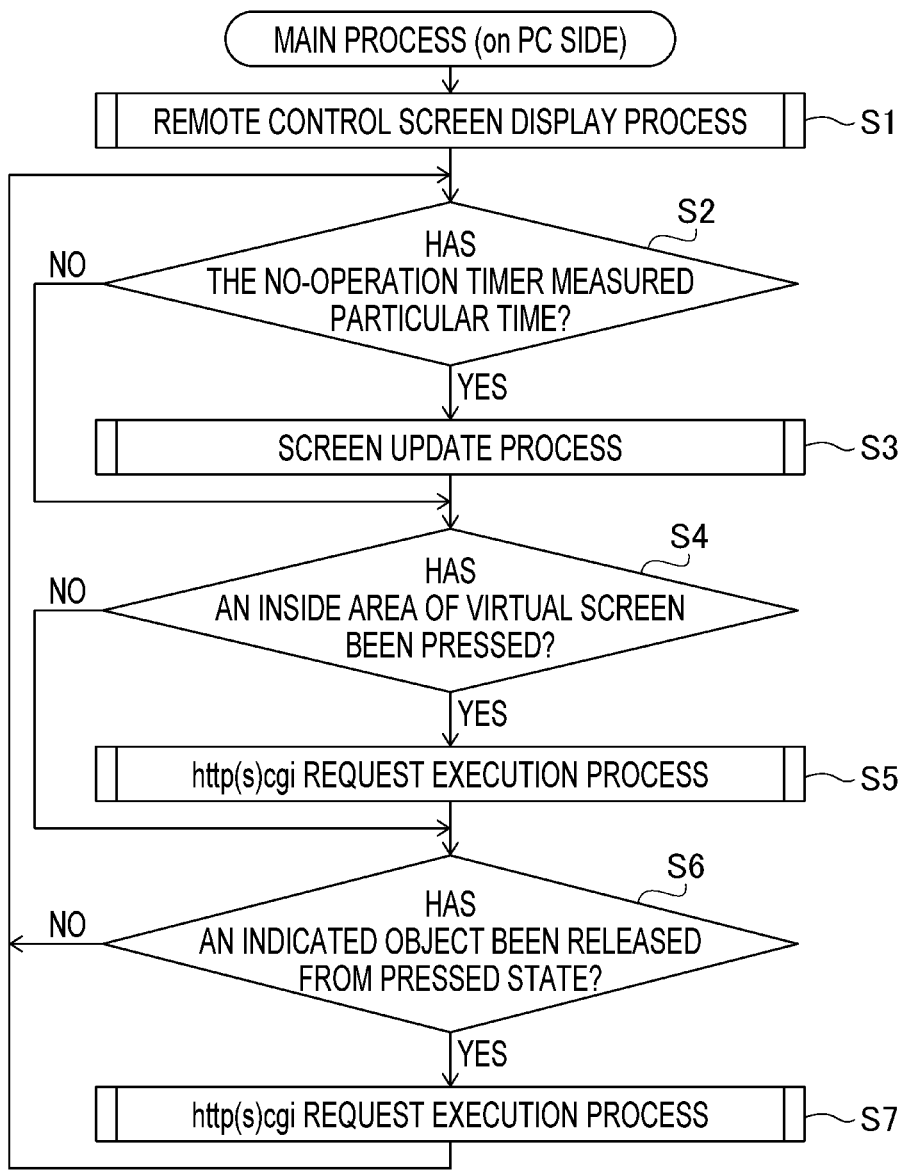
FIG. 6 is a flowchart showing a procedure of a main process to be performed by a CPU of the PC, in the illustrative embodiment according to one or more aspects of the present disclosure.

FIG. 6 is a flowchart showing a procedure of a main process to be performed by the CPU 12 of the PC 10. The main process is performed by the CPU 12 after completion of login authentication on the login authentication screen 190 shown in FIG. 2B. Hereinafter, in an explanation of a procedure of each process, each of steps included in each process will be denoted with "S" attached in front of a corresponding number.

In the main process shown in FIG. 6, the CPU 12 first executes a remote control screen display process (S1). The remote control screen is the "Remote Panel" displayed in the detail pane 184. Therefore, the remote control screen display process indicates a process of displaying the "Remote Panel" in the detail pane 184.

Figure 7:
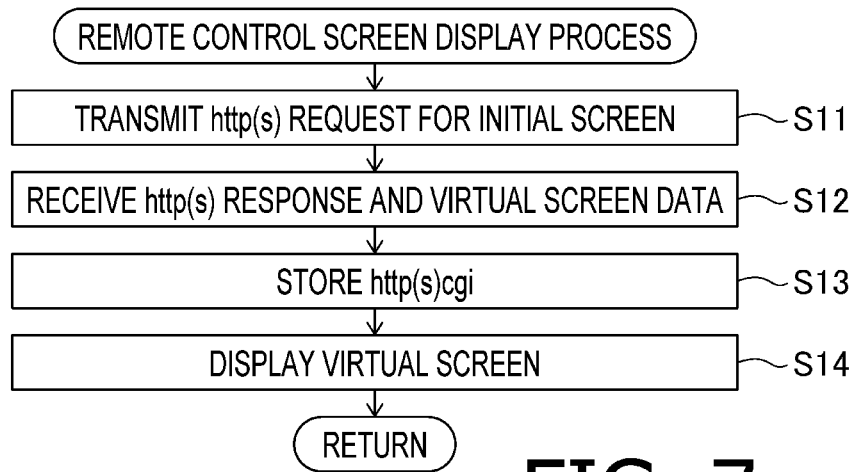
FIG. 7 is a flowchart showing a procedure of a remote control screen display process included in the main process shown in FIG. 6, in the illustrative embodiment according to one or more aspects of the present disclosure.

FIG. 7 shows a detailed procedure of the remote control screen display process. In the remote control screen display process shown in FIG. 7, first, the CPU 12 transmits an http(s) request for an initial screen (S11). Here, the http(s) request is a request according to an http(s) protocol. The reason why the request according to the http(s) protocol is transmitted as above is that a transmission destination of the request is the EWS, and therefore it is required to transmit the request according to a protocol interpretable by the EWS. The http(s) request for the initial screen is input from the network I/F 20 to the network I/F 108 via the communication network 40 and the router 32. Not only transmission of the http(s) request for the initial screen, but also data transmission from the PC 10 to the MFP 100 is performed through the same route. Conversely, data transmission from the MFP 100 to the PC 10 is performed through the reverse route.

Next, CPU 12 receives an http(s) response and virtual screen data transmitted by the EWS in response to receipt of the http(s) request for the initial screen (S12). The http(s) response and the virtual screen data are generated and transmitted in a below-mentioned initial screen transmission process in S43 (see FIG. 10).

Next, the CPU 12 stores an http(s)cgi in the data storage area 28 (S13). The http(s)cgi contains various scripts included in the http(s) response. It is noted that "cgi" is an abbreviation for "common gateway interface." In the illustrative embodiment, as the various scripts, a no-operation timer script, a screen data request script, a screen pressing process script, and a release process script are generated (see S71 to S73 in FIG. 11). The CPU 12 is enabled to perform various processes such as a no-operation timer process and an http(s)cgi request transmission process by executing the various scripts.

Further, the CPU 12 displays a virtual screen based on the received virtual screen data, in the detail pane 184 (S14). Thereafter, the CPU 12 terminates the remote control screen display process. Thereby, the "Remote Panel" as shown in FIG. 3 is displayed in the detail pane 184.

Referring back to FIG. 6, the CPU 12 determines whether a no-operation timer has measured a particular time (S2). Here, the "particular time" is, for example, 0.5 seconds. The no-operation timer is a timer that is instructed to start in a below-mentioned step S35 (see FIG. 9).

When determining in S2 that the no-operation timer has measured the particular time (S2: Yes), the CPU 12 performs a screen update process (S3) and then proceeds to S4. Meanwhile, when determining that the no-operation timer has not measured the particular time (S2: No), the CPU 12 goes to S4 without executing S3.

Figure 8:
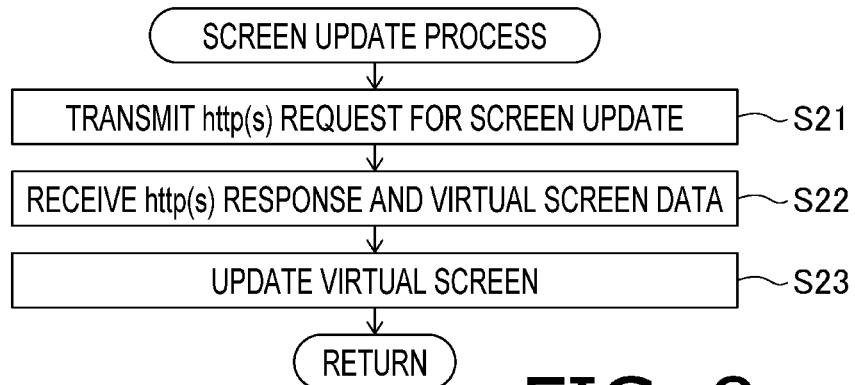
FIG. 8 is a flowchart showing a procedure of a screen update process included in the main process shown in FIG. 6, in the illustrative embodiment according to one or more aspects of the present disclosure.

FIG. 8 shows a detailed procedure of the screen update process. In the screen update process shown in FIG. 8, first, the CPU 12 transmits an http(s) request for screen update (S21). Subsequently, the CPU 12 receives an http(s) response and virtual screen data transmitted by the EWS in response to receipt of the http(s) request for screen update (S22). The http(s) response and the virtual screen data are generated and transmitted in a below-mentioned screen data transmission process in S45 (see FIG. 10).

Then, the CPU 12 updates the virtual screen (i.e., the "Remote Panel") based on the received virtual screen data (S23). Afterward, the CPU 12 terminates the screen update process. Thereby, the "Remote Panel" displayed in the detail pane 184 matches the current display screen on the panel 105 of the MFP 100.

Referring back to FIG. 6, the CPU 12 determines whether an inside area of the virtual screen has been pressed (S4). When determining that an inside area of the virtual screen has been pressed (S4: Yes), the CPU 12 performs an http(s)cgi request execution process (S5), and then proceeds to S6. Meanwhile, when determining that an inside area of the virtual screen has not been pressed (S4: No), the CPU 12 goes to S6 without executing S5.

Figure 9:
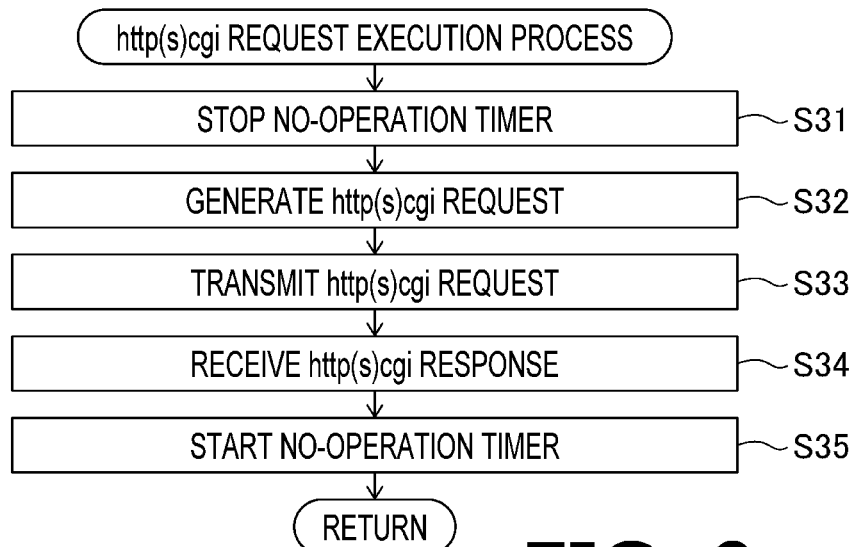
FIG. 9 is a flowchart showing a procedure of an http(s)cgi request execution process included in the main process shown in FIG. 6, in the illustrative embodiment according to one or more aspects of the present disclosure.

FIG. 9 shows a detailed procedure of the http(s)cgi request execution process. In the http(s)cgi request execution process shown in FIG. 9, first, the CPU 12 stops the no-operation timer (S31). The reason why the no-operation timer is stopped is to postpone execution of the screen update process in S3 such that the "Remote Panel" is not updated until the http(s)cgi request execution process is completed. If there is an icon or a button in the pressed position on the virtual screen, the screen may transition into another one, or the color of the pressed button may change. The http(s)cgi request execution process is a process that makes such a change in the display mode of the display screen appear on the virtual screen. Therefore, if the screen update process is performed during the execution of the http(s)cgi request execution process, there may be a discrepancy between the virtual screen on the display 18 and the real screen on the panel 105. The process of S31 is for preventing the above problem.

Next, the CPU 12 generates an http(s)cgi request (S32) and transmits the generated http(s)cgi request (S33). The generated http(s)cgi request includes screen pressing information representing that the screen has been pressed, and coordinates (hereinafter referred to as "press coordinates") of the pressed position.

Subsequently, the CPU 12 receives an http(s)cgi response transmitted by the EWS in response to receipt of the http(s)cgi request and performs a process according to the received http(s)cgi response (S34). The http(s)cgi response is generated and transmitted in a below-mentioned screen pressing process in S47 (see FIG. 10).

Further, the CPU 12 starts the no-operation timer (S35). Thereafter, the CPU 12 terminates the http(s)cgi request execution process. Afterward, when the no-operation timer measures the aforementioned particular time (e.g., 0.5 seconds), the CPU 12 performs the screen update process in S3 once.

Referring back to FIG. 6, the CPU 12 determines whether an indicated object has been released from a pressed state (S6). The indicated object is an object pressed and indicated when an inside area of the virtual screen is pressed. In other words, examples of the indicated body include both objects (e.g., icons and buttons) that fulfill meaningful functions when pressed and objects (e.g., part of a background image) that do not fulfill any meaningful functions even when pressed. Further, it is noted that, hereinafter, "released from the pressed state" may be simply expressed as "released."

When determining that the indicated object has been released from the pressed state (S6: Yes), the CPU 12 performs the http(s)cgi request execution process (S7), and thereafter goes back to S2. Meanwhile, when determining that the indicated object has not been released from the pressed state (S6: No), the CPU 12 goes back to S2 without executing S7. The http(s)cgi request execution process in S7 is the http(s)cgi request execution process shown in FIG. 9. However, contents of the http(s)cgi request generated when the http(s)cgi request execution process is performed in S7 is different from contents of the http(s)cgi request generated when the http(s)cgi request execution process is performed in S5. Specifically, the http(s)cgi request generated in S5 includes the screen pressing information, as described above. On the other hand, the http(s)cgi request generated in S7 includes release information representing that the indicated object has been released from the pressed state, and coordinates (hereinafter referred to as "release coordinates") of a position where the indicated object has been released from the pressed state.

Figure 10:
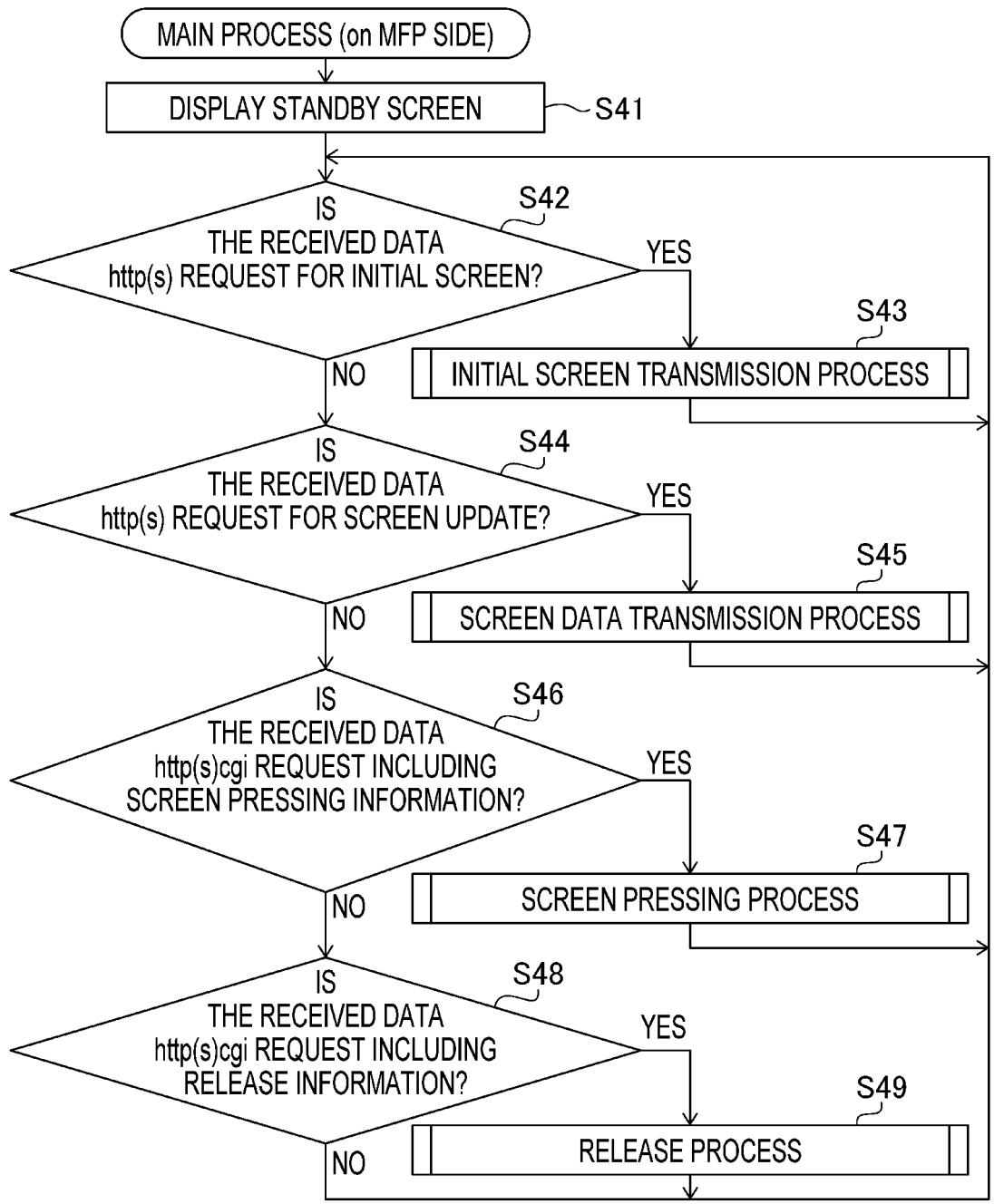
FIG. 10 is a flowchart showing a procedure of a main process to be performed by a CPU of the MFP, in the illustrative embodiment according to one or more aspects of the present disclosure.

FIG. 10 shows a procedure of a main process by the CPU 101 of the MFP 100. In the main process shown in FIG. 10, the CPU 101 first displays a standby screen on the panel 105 (S41). For instance, the standby screen may be a screen similar to the panel display 105b shown in FIG. 3.

Subsequently, the CPU 101 determines whether data received via http(s) communication (i.e., data communication according to an http(s) protocol) is an http(s) request for the initial screen (S42). When determining that the data received via the http(s) communication is the http(s) request for the initial screen (S42: Yes), the CPU 101 performs an initial screen transmission process (S43). Thereafter, the CPU 101 goes back to S42.

Figure 11:
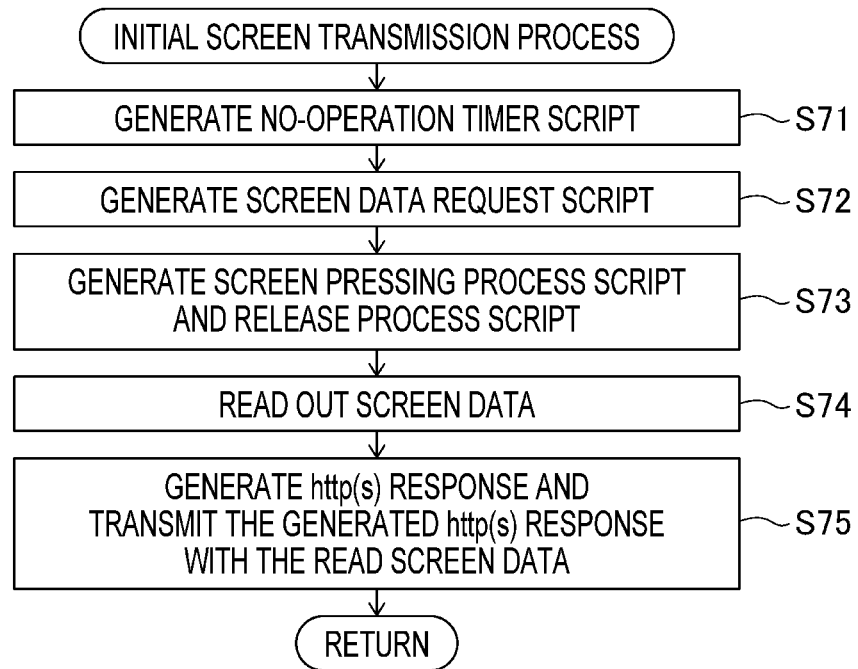
FIG. 11 is a flowchart showing a procedure of an initial screen transmission process included in the main process shown in FIG. 10, in the illustrative embodiment according to one or more aspects of the present disclosure.

FIG. 11 shows a detailed procedure of the initial screen transmission process. In the initial screen transmission process shown in FIG. 11, first, the CPU 101 generates the no-operation timer script (S71). The no-operation timer script is a program for causing the browser to operate the no-operation timer and perform, for instance, the process of S2.

Next, the CPU 101 generates the screen data request script (S72). The screen data request script is a program for causing the browser to perform a screen data request process and generate an http(s) request including a screen data request (e.g., the http(s) request for screen update that is transmitted in S21).

Subsequently, the CPU 101 generates a screen pressing process script and a release process script (S73). The screen pressing process script is a program for causing the browser to perform a screen pressing process and perform, for instance, the determination of S4, and the processes of S31 to S33 in the http(s)cgi request execution process (see FIG. 9) to be performed in S5 when the determination of S4 is affirmative (i.e., S4: Yes). Further, the release process script is a program for causing the browser to perform a release process and perform, for instance, the determination of S6, and the processes of S31 to S33 in the http(s)cgi request execution process to be performed in S7 when the determination of S6 is affirmative (i.e., S6: Yes).

Next, the CPU 101 reads out screen data (S74). The screen data is screen data of the screen being currently displayed on the panel 105 of the MFP 100. To display a screen on the panel 105, the MFP 100 generates screen data of the screen, stores the generated screen data in the RAM 103, reads out the screen data from the RAM 103, and displays on the panel 105 the screen based on the screen data. Accordingly, in S74, the CPU 101 reads out the screen data from the RAM 103.

Subsequently, the CPU 101 generates an http(s) response, and transmits the generated http(s) response with the read screen data (S75). Thereafter, the CPU 101 terminates the initial screen transmission process. The http(s) response is a response to the http(s) request for the initial screen as transmitted in S11 (see FIG. 7). The http(s) response includes the scripts generated in S71 to S73 and information representing that the screen data is transmitted together with the http(s) response.

Referring back to FIG. 10, when determining in S42 that the data received via the http(s) communication is not the http(s) request for the initial screen (S42: No), the CPU 101 determines whether the data received via the http(s) communication is an http(s) request for screen update (S44). When determining that the data received via the http(s) communication is the http(s) request for screen update (S44: Yes), the CPU 101 performs a screen data transmission process (S48). Afterward, the CPU 101 goes back to S42.

Figure 12:
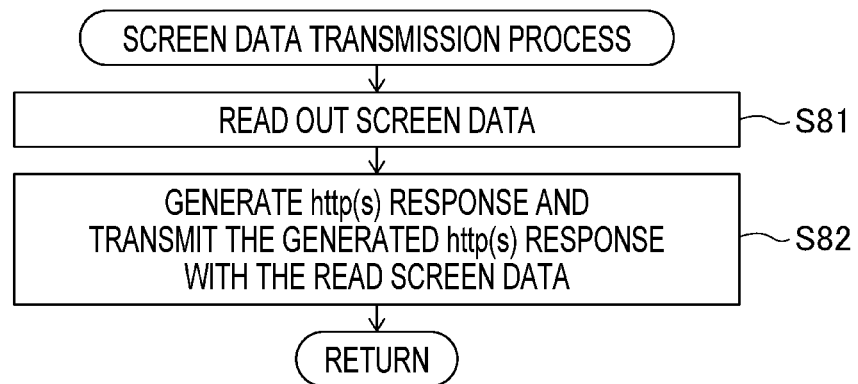
FIG. 12 is a flowchart showing a procedure of a screen data transmission process included in the main process shown in FIG. 10, in the illustrative embodiment according to one or more aspects of the present disclosure.

FIG. 12 shows a detailed procedure of the screen data transmission process. In the screen data transmission process shown in FIG. 12, first, the CPU 101 reads out screen data (S81). Specifically, in S81, the CPU 101 reads out the screen data stored in the RAM 103 in the aforementioned step S93 (see FIG. 13) or screen data stored in the RAM 103 in a below-mentioned step S105 (see FIG. 14A).

Next, the CPU 101 generates an http(s) response and transmits the generated http(s) response with the read screen data (S82). Thereafter, the CPU 101 terminates the screen data transmission process. The process of S82 is different from the process of S75 only in that the http(s) response is a response to the http(s) request for screen update as transmitted in S21 (see FIG. 8). Therefore, a further explanation of the process of S82 is omitted.

Referring back to FIG. 10, when determining in S44 that the data received via the http(s) communication is not the http(s) request for screen update (S44: No), the CPU 101 determines whether the data received via the http(s) communication is an http(s)cgi request including the screen pressing information (S46). When determining that the data received via the http(s) communication is the http(s)cgi request including the screen pressing information (S46: Yes), the CPU 101 performs the screen pressing process (S47). Thereafter, the CPU 101 goes back to S42.

Figure 13:
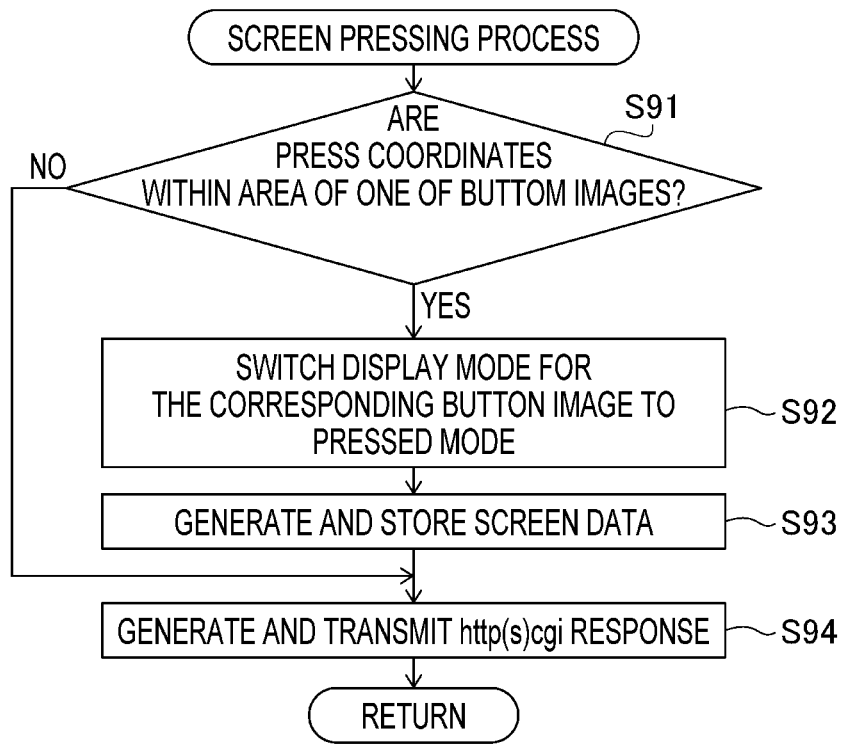
FIG. 13 is a flowchart showing a procedure of a screen pressing process included in the main process shown in FIG. 10, in the illustrative embodiment according to one or more aspects of the present disclosure.

FIG. 13 shows a detailed procedure of the screen pressing process. In the screen pressing process shown in FIG. 13, first, the CPU 101 determines whether the press coordinates are within an area of one of button images (S91). When determining that the press coordinates are within an area of one of the button images (S91: Yes), the CPU 101 switches a display mode for the corresponding button image to a pressed mode (S92). For instance, the button images may include, but are not limited to, object images corresponding to the icons (e.g., the "Fax" icon 105b1, the "Copy" icon 105b2, etc.) and the buttons (e.g., the "Basic 1" button, the "Custom 1" button, etc.) in the panel display 105b (see FIG. 3A). Further, for instance, "switching the display mode for the button image to the pressed mode" may denote switching the color of the button image from a color for a non-pressed mode (i.e., a normal mode) to another color.

Next, the CPU 101 generates screen data and stores the generated screen data in the RAM 103 (S93). Thereafter, the CPU 101 goes to S94. The screen data stored in the RAM 103 is read out and used in the screen data transmission process (see FIG. 12).

Meanwhile, when determining in S91 that the press coordinates are not within an area of one of the button images (S91: No), the CPU 101 skips S92 and S93 and proceeds to S94.

In S94, the CPU 101 generates and transmits an http(s) response. Afterward, the CPU 101 terminates the screen pressing process.

Referring back to FIG. 10, when determining in S46 that the data received via the http(s) communication is not the http(s)cgi request including the screen pressing information (S46: No), the CPU 101 determines whether the data received via the http(s) communication is an http(s)cgi request including the release information (S48). When determining that the data received via the http(s) communication is the http(s)cgi request including the release information (S48: Yes), the CPU 101 performs the release process (S49). Afterward, the CPU 101 goes back to S42. Meanwhile, when determining that the data received via the http(s)

communication is not the http(s)cgi request including the release information (S48: No), the CPU 101 goes back to S42.

Figure 14A:
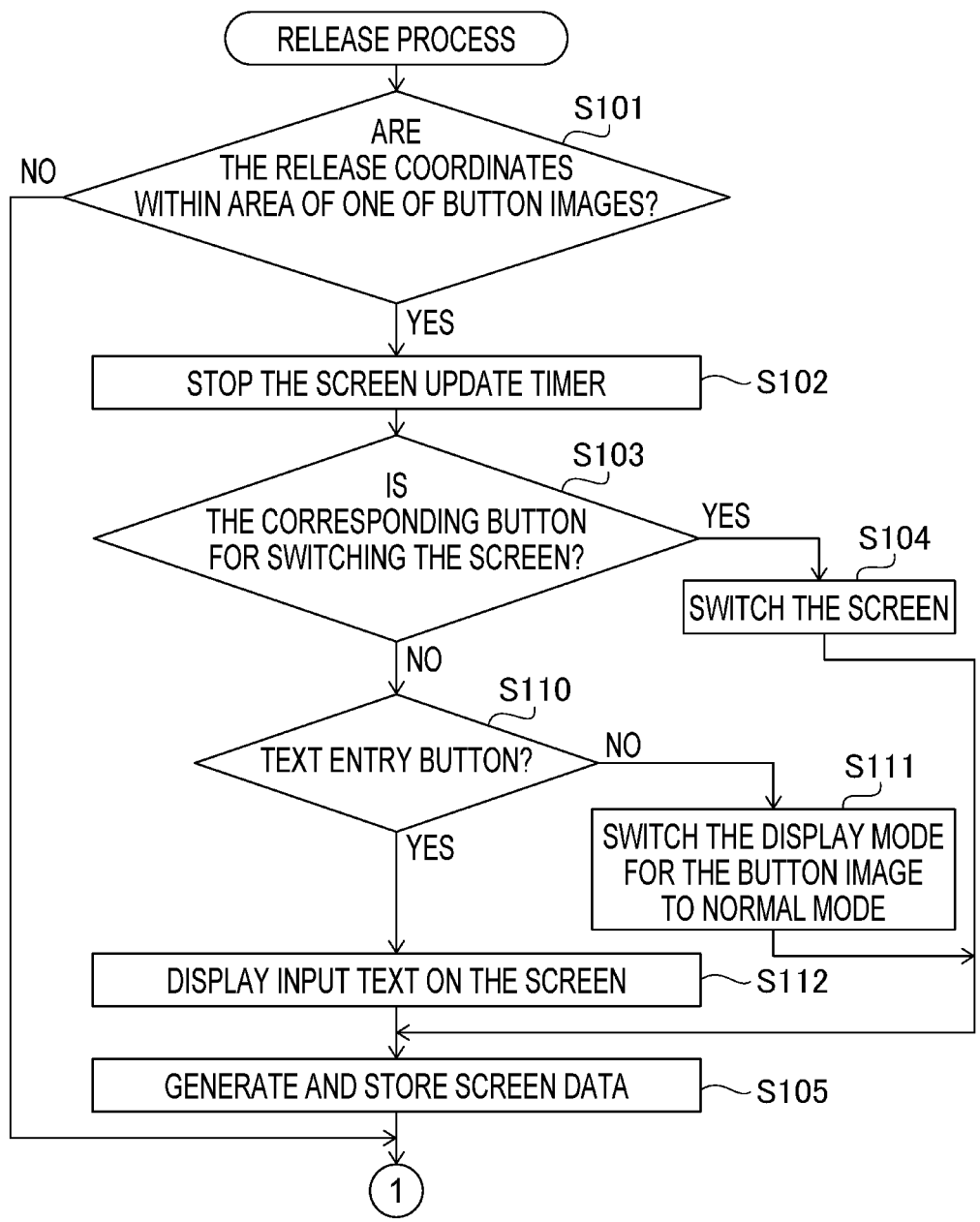
FIGS. 14A and 14B are flowcharts showing a procedure of a release process included in the main process shown in FIG. 10, in the illustrative embodiment according to one or more aspects of the present disclosure.
Figure 14B:
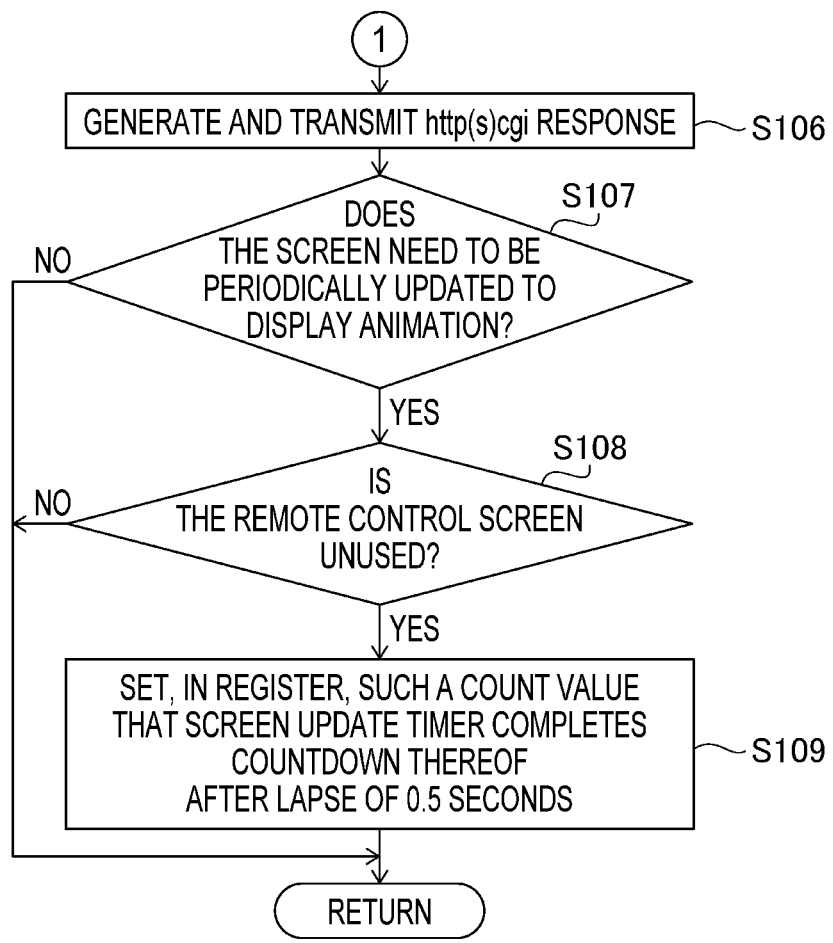

FIGS. 14A and 14B show a detailed procedure of the release process. In the release process shown in FIGS. 14A and 14B, the CPU 101 first determines whether the release coordinates are within an area of one of the button images (S101). When determining in S101 that the release coordinates are within an area of one of the button images (S101: Yes), the CPU 101 stops a screen update timer (S102). The screen update timer is a timer controlled by the CPU 101. When a count value is stored in a register, and the screen update timer is instructed to start, the screen update timer starts counting down the count value at a particular timing. Then, when the count value in the register becomes "0," the screen update timer generates an interrupt signal and outputs the interrupt signal to the CPU 101. In response to receipt of the interrupt signal from the screen update timer, the CPU 101 performs a time-up interrupt process, which will be described below with reference to FIG. 15.

Next, the CPU 101 determines whether a button corresponding to the button image that is determined in S101 to have the release coordinates within the area thereof is for switching the screen (S103). When determining that the corresponding button is for switching the screen (S103: Yes), the CPU 101 switches the screen display on the panel 105 to a screen indicated by the button (S104). Thereafter, the CPU 101 goes to S106. For instance, the button may be the "Copy" icon 105b2 in the panel display 105b shown in FIG. 3. In this case, when the "Copy" icon 105b2 is released from the pressed state, the CPU 101 may switch the panel display 105b to the copy screen 105e shown in FIG. 4C.

In S105, the CPU 101 generates and stores screen data of a screen to be displayed on the "Remote Panel." When proceeding from S104 to S105, the CPU 101 generates screen data that represents the same screen as displayed on the panel 105 after the switching in S104, and stores the generated screen data in the RAM 103 in the same manner as in S93. If the screen display on the panel 105 after the switching is, for instance, the copy screen 105e, the CPU 101 generates screen data for causing the "Remote Panel" to display thereon substantially the same screen as the copy screen 105e, and stores the generated screen data in the RAM 103.

Next, the CPU 101 generates and transmits an http(s)cgi response (S106). Thereafter, the CPU 101 goes to S107. For instance, when the "Copy" icon 105b2 is released, and the CPU 101 proceeds from S104 to S106 via S105, the http(s) cgi response generated in S106 is a response to the http(s)cgi request generated when the "Copy" icon 105b2 is released. In the transmission of the http(s)cgi response, the screen data generated in S105 is also transmitted together. Hence, the http(s)cgi response includes information that represents that the screen data is transmitted together with the http(s)cgi response and identifies the screen data. The http(s)cgi response transmitted in S106 is received in S34 of the http(s)cgi request execution process (see FIG. 9) invoked in S7 (see FIG. 6). The CPU 12 of the PC 10 performs processing according to the http(s)cgi response. Thereby, (substantially the same screen as) the copy screen 105e is displayed on the "Remote Panel" as well.

On the other hand, when determining in S103 that the corresponding button is not for switching the screen (S103: No), the CPU 101 determines whether the button is a text entry button (S110). When determining that the button is not a text entry button (S110: No), the CPU 101 switches the display mode for the button image of the button within the display screen on the panel 105 to a normal mode (S111). Afterward, the CPU 101 proceeds to S105, and executes S105 and S106. Thus, the display mode for the button image of the released button is switched from the pressed mode to the normal mode, on the "Remote Panel" as well as on the panel 105.

On the other hand, when determining in S110 that the button is a text entry button (S110: Yes), the CPU 101 displays an input text on the screen (S112). Thereafter, the CPU 101 goes to S105, and then executes S105 and S106. Thereby, for instance, as the text entry screen 105d shown in FIG. 4A, input characters are displayed on the panel 105 and on the "Remote Panel" as well.

Meanwhile, when determining in S101 that the release coordinates are not within an area of one of the button images (S101: No), the CPU 101 proceeds from S101 to S106, and executes S106. In this case, the CPU 101 does not execute S105 (i.e., does not generate or store screen data). Hence, screen data is not transmitted together with the http(s)cgi response generated in S106.

In S107, the CPU 101 determines whether the screen needs to be periodically updated to display an animation. More specifically, in S107, the CPU 101 determines whether an animation is being displayed on the panel 105. This is because if an animation is being displayed on the panel 105, the screen needs to be periodically updated.

When determining in S107 that the screen needs to be periodically updated (S107: Yes), the CPU 101 determines whether the remote control screen is unused, i.e., whether the "Remote Panel" is un-displayed in the detail pane 184 (S108). When determining that the remote control screen is unused (S108: Yes), the CPU 101 sets, in the register, such a count value that the screen update timer completes the countdown thereof after a lapse of 0.5 seconds (S109). Thereafter, the CPU 101 terminates the release process. The determination in S108 is for determining whether there is a risk that an excessively large load may be put on the CPU 101. If the remote control screen (i.e., the "Remote Panel") is unused, the CPU 101 does not need to generate screen data for displaying the same screen as the display screen on the panel 105 or transmit the screen data to the PC 10. Hence, the CPU 101 is unlikely to bear thereon an excessively large load. Therefore, in this case, the CPU 101 sets a normal time interval (e.g., 0.5 seconds) for the screen update timer as a time interval for screen update.

Meanwhile, when determining in S107 that the screen does not need to be periodically updated (S107: No) or determining in S108 that the remote control screen is not unused (i.e., the remote control screen is in use) (S108: No), the CPU 101 skips S109 and terminates the release process. If the remote control screen (i.e., the "Remote Panel") is in use, the load on the CPU 101 might be excessively large. Hence, the CPU 101 skips S109 and does not perform startup control of the screen update timer. The screen update timer has been stopped in S102. Therefore, in this case, the screen update timer is kept stopped.

Figure 15:
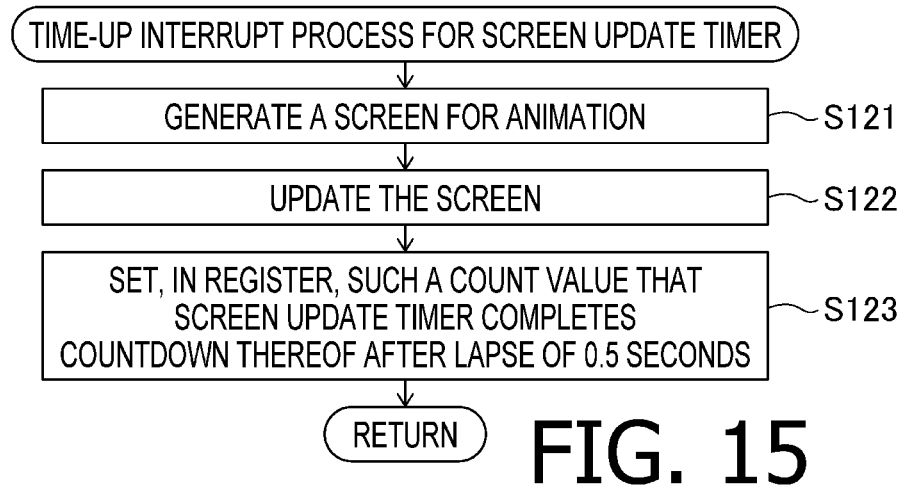
FIG. 15 is a flowchart showing a procedure of a time-up interrupt process for a screen update timer to be performed by the CPU of the MFP, in the illustrative embodiment according to one or more aspects of the present disclosure.

FIG. 15 shows a procedure of the time-up interrupt process for the screen update timer. In the time-up interrupt process shown in FIG. 15, the CPU 101 first generates a screen for an animation (hereinafter, simply referred to as an "animation screen") (S121). When the animation to be displayed is, for instance, a blinking display of the cursor C1 blinking in the text entry screen 105d as shown in FIG. 4A, in S121, the CPU 101 generates either an animation screen (i.e., the text entry screen 105d shown in FIG. 4A) of the cursor C in a turned-on state or an animation screen (i.e., the text entry screen 105d' shown in FIG. 4B) of the cursor C in a turned-off state. The text entry screen 105*d* and the text entry screen 105*d'* are generated alternately. Meanwhile, when the animation to be displayed is, for instance, the copy-in-progress display I1 on the copy-in-progress screen 105*f* as shown in FIG. 5A, in S121, the CPU 101 generates, as an animation screen, one of the copy-in-progress screens 105*f* to 105*f'* (see FIGS. 5A to 5C) that include the copy-in-progress displays I1 to I3, respectively. Then, the CPU 101 generates one of the copy-in-progress screens 105*f* to 105*f'* while sequentially switching the animation screen to be generated from one screen to another among the copy-in-progress screens 105*f* to 105*f'*.

Next, the CPU 101 updates the screen (S122). Thereby, the panel 105 displays thereon one of the text entry screens 105*d* and 105*d'* as respectively shown in FIGS. 4A and 4B or one of the copy-in-progress screens 105*f* to 105*f'* as respectively shown in FIGS. 5A to 5C.

Further, the CPU 101 sets, in the register, such a count value that the screen update timer completes the countdown thereof after a lapse of 0.5 seconds (S123). Thereafter, the CPU 101 terminates the time-up interrupt process for the screen update timer.

Thus, the time-up interrupt process is for displaying an animation on the panel 105 when the "Remote Panel" is not in use. On the other hand, the time-up interrupt process is not performed while the "Remote Panel" is in use. Therefore, even though an animation is displayed when the "Remote Panel" is not in use, the update of the animation is stopped while the "Remote Panel" is in use. However, when the animation is, for instance, the blinking display of the cursor C1 or C2, if the update of the animation is stopped with the said cursor turned off, it becomes unknown where the cursor is. Therefore, when the animation is the blinking display of the cursor C1 or C2, the update of the animation is stopped with the said cursor turned on. When the animation is displayed, for instance, as a transition from one still image to another of the copy-in-progress displays I1 to I3, if the update of the animation is stopped, it becomes unknown whether the copying is in progress. Therefore, when the animation is displayed as a transition from one still image to another of the copy-in-progress displays I1 to I3, the update of the animation is not stopped, but the respective still images of the copy-in-progress displays I1 to I3 are controlled to be displayed transitionally from one still image to another at longer time intervals. The control to extend the time interval for sequentially switching the target image to be displayed from one still image to another among the respective still images of the copy-in-progress displays I1 to I3 constituting the animation may be achieved by changing a part of the release process shown in FIGS. 14A and 14B and a part of the time-up interrupt process shown in FIG. 15.

Figure 16A:
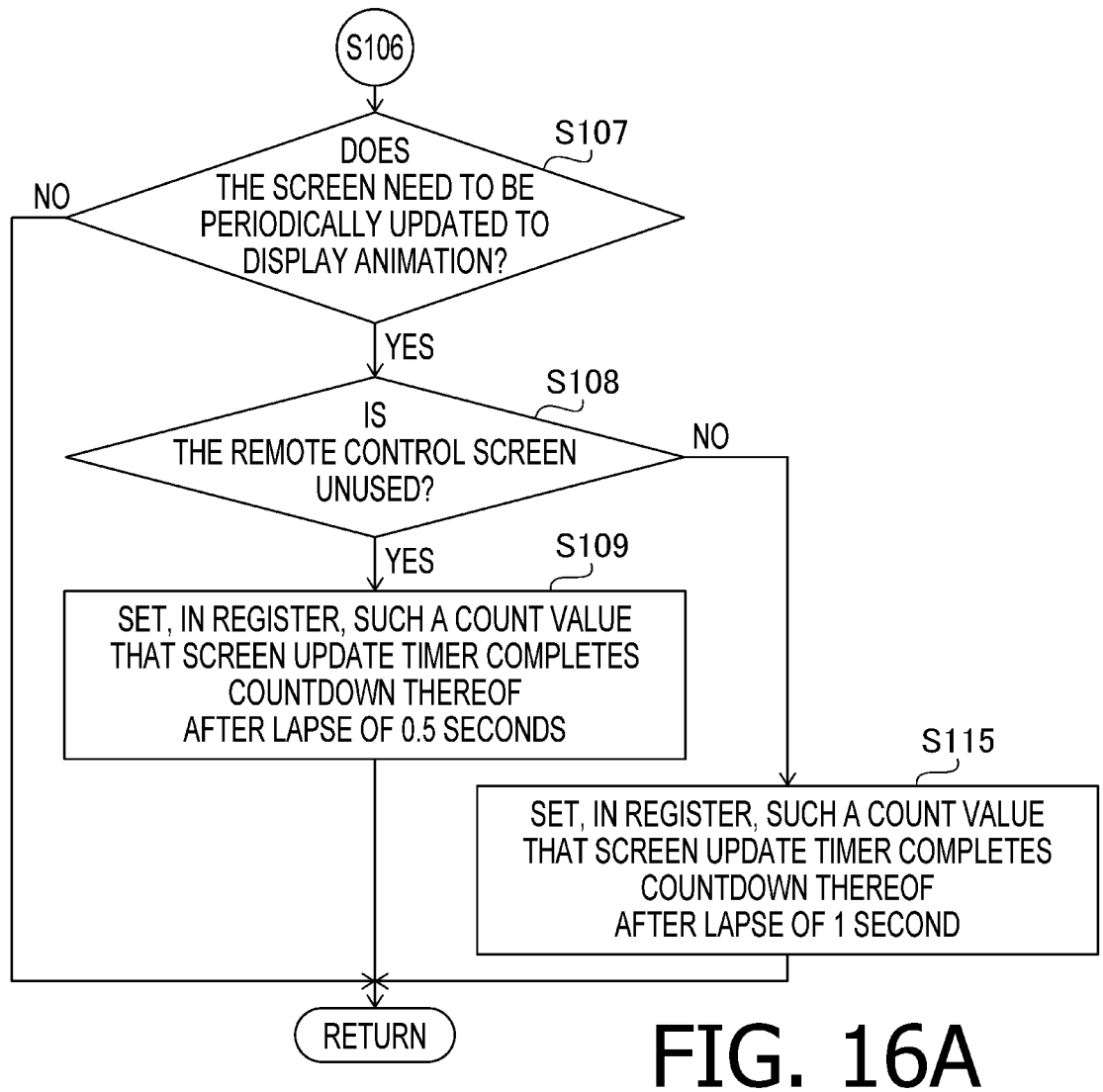
FIG. 16A is a flowchart showing shows a procedure of a modified portion of the release process shown in FIGS. 14A and 14B, in a modification of the illustrative embodiment according to one or more aspects of the present disclosure.
Figure 16B:
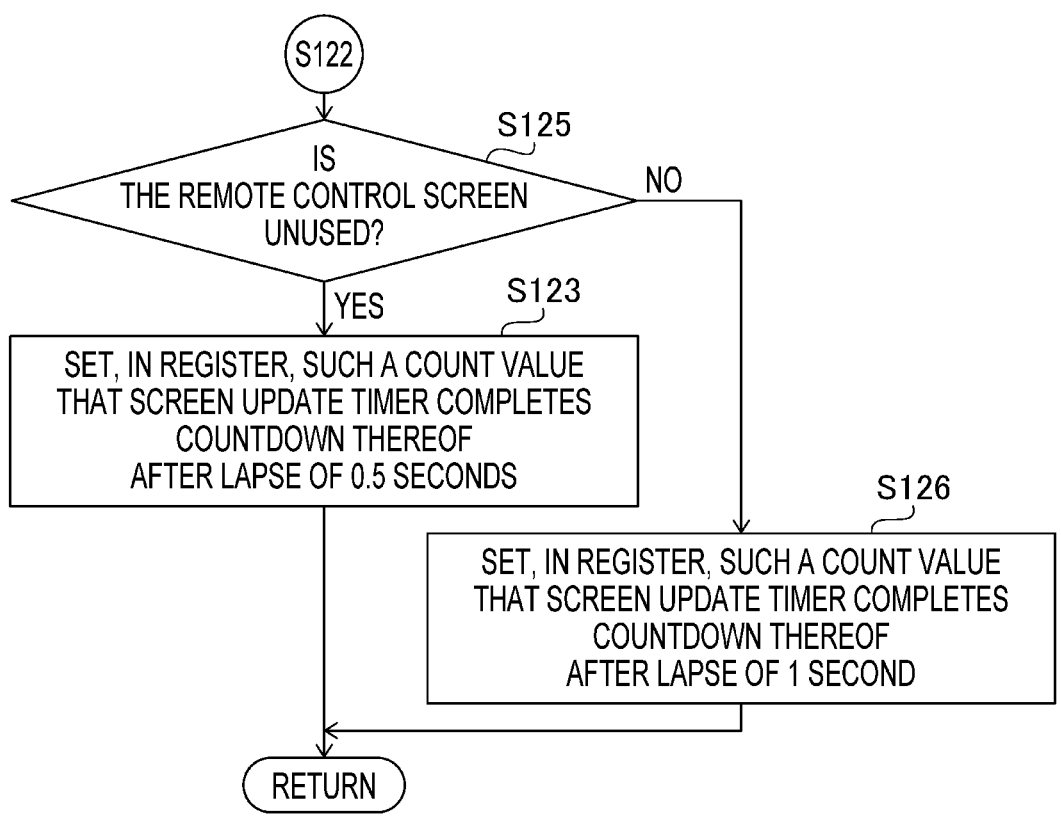
FIG. 16B is a flowchart showing shows a procedure of a modified portion of the time-up interrupt process shown in FIG. 15, in a modification of the illustrative embodiment according to one or more aspects of the present disclosure.

FIG. 16A shows a procedure of the modified portion of the release process shown in FIGS. 14A and 14B. FIG. 16B shows a procedure of the modified portion of the time-up interrupt process shown in FIG. 15. In FIGS. 16A and 16B, each of substantially the same processes as in FIGS. 14 and 15 will be indicated with the same reference characters, and a detailed explanation thereof may be omitted.

In FIG. 16A, when determining that the remote control screen is not unused (i.e., the remote control screen is in use) (S108: No), the CPU 101 sets, in the register, such a count value that the screen update timer completes the countdown thereof after a lapse of 1 second (S115). Thereafter, the CPU 101 terminates the release process. Thereby, the time-up interrupt process is invoked with the time interval changed from 0.5 seconds to 1 second. Therefore, the time interval, for sequentially switching the target image to be displayed from one still image to another among the still images constituting the animation, is increased from the normal time interval, i.e., 0.5 seconds (see S109) to 1 second.

On the other hand, in FIG. 16B, when proceeding from S122 to S125, the CPU 101 determines whether the remote control screen is unused, i.e., whether the "Remote Panel" is un-displayed in the detail pane 184 (S125), in substantially the same manner as in S108. When determining that the remote control screen is not unused (i.e., the remote control screen is in use) (S125: No), the CPU 101 sets, in the register, such a count value that the screen update timer completes the countdown thereof after a lapse of 1 second (S126), in substantially the same manner as in S115. Thereafter, the CPU 101 terminates the time-up interrupt process. Thereby, the time-up interrupt process is continuously invoked with the time interval kept changed to 1 second. Therefore, the time interval, for sequentially switching the target image to be displayed from one still image to another among the still images constituting the animation, is increased from the normal time interval, i.e., 0.5 seconds (see S109) to 1 second.

As described above, the MFP 100 of the illustrative embodiment includes the network I/F 108, the panel 105, and the CPU 101. The CPU 101 displays an animation on the panel 105 by sequentially switching the target image to be displayed from one still image to another of the still images constituting the animation. Further, when the MFP 100 is remotely connected with the PC 10 via the network I/F 108, the CPU 101 changes how to display the animation.

Thus, the MFP 100 of the illustrative embodiment is enabled to prevent the load on the CPU 101 from being excessively large even when an animation is being displayed on the MFP 100 side.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications may be feasible.

In the aforementioned illustrative embodiments, the MFP 100 has been described as an example of an "image forming apparatus" according to aspects of the present disclosure. However, examples of the "image forming apparatus" according to aspects of the present disclosure may include, but are not limited to, standalone printers, standalone image scanners, and standalone copy machines, as well as the MFP 100.

In the aforementioned illustrative embodiments, the CPU 101 has been described as an example of a "controller" according to aspects of the present disclosure. However, the "controller" according to aspects of the present disclosure may include one or more CPUs and one or more dedicated circuits. Examples of the dedicated circuits may include, but are not limited to, ASICs ("ASIC" is an abbreviation for "Application Specific Integrated Circuit") and FPGAs ("FPGA" is an abbreviation for "Field Programmable Gate Array").

The following shows examples of associations between elements exemplified in the aforementioned illustrative embodiments and modifications and elements according to aspects of the present disclosure. The MFP 100 may be an example of an "image forming apparatus" according to aspects of the present disclosure. The network I/F 108 may be an example of a "communication interface" according to aspects of the present disclosure. The panel 105 may be an example of a "display" according to aspects of the present disclosure. The CPU 101 may be included in a "controller" according to aspects of the present disclosure. The CPU 101 may be an example of a "processor" according to aspects of the present disclosure. The ROM 102 storing the control programs 102a may also be included in the "controller" according to aspects of the present disclosure. The ROM 102 storing the control programs 102a may be an example of a "memory storing computer-readable instructions" according to aspects of the present disclosure, and may also be an example of a "non-transitory computer-readable medium storing computer-readable instructions" according to aspects of the present disclosure. The PC 10 may be an example of an "information processing device" according to aspects of the present disclosure.

What is claimed is:

1. An image forming apparatus comprising:
    at least one of a print engine and a scan engine;
    a communication interface;
    a display; and
    a controller configured to:
        perform at least one of:
            controlling the print engine to perform printing and controlling the display to display a status of the printing; and
            controlling the scan engine to perform image scanning and controlling the display to display a status of the image scanning;
        perform communication for providing a remote panel with an information processing device via the communication interface, thereby placing the image forming apparatus into a remote panel providing state, wherein when the image forming apparatus is in the remote panel providing state, in response to a display screen on the display being switched from a first screen to a second screen, the controller transmits, to the information processing device, remote panel data for causing the information processing device to display the remote panel including the second screen;
        when the display screen includes an animation, sequentially switch a target image to be displayed from one still image to another among a plurality of still images constituting the animation, thereby displaying the animation on the display;
        after the target image is switched from the one still image to the another still image, transmit the remote panel data to the information processing device, thereby causing the information processing device to display the remote panel including the another still image;
        display the animation in a first manner, when the remote panel is not displayed on the information processing device; and
        change the first manner to display the animation to a second manner different from the first manner, when the remote panel is displayed on the information processing device.

2. The image forming apparatus according to claim 1, wherein the controller is further configured to change the first manner to display the animation to the second manner, by displaying at least one but not all of the plurality of still images constituting the animation, to display a part of the animation on the display.

3. The image forming apparatus according to claim 2, wherein the animation is a blinking display of a cursor, wherein the plurality of still images include a first image representing the cursor turned on, and a second image representing the cursor turned off, and
wherein the controller is further configured to:
    sequentially switch the target image to be displayed between the first image and the second image; and
    when the image forming apparatus is remotely connected with the information processing device, change the first manner for blinking the cursor to the second manner for keeping the cursor turned on, by displaying only the first image on the display.

4. The image forming apparatus according to claim 2, wherein the animation is a cursor displayed while switching a display mode therefor between a first display mode and a second display mode,
wherein the plurality of still images include a first image representing the cursor displayed in the first display mode, and a second image representing the cursor displayed in the second display mode, and
wherein the controller is further configured to:
    sequentially switch the target image to be displayed between the first image and the second image; and
    when the image forming apparatus is remotely connected with the information processing device, change the first manner for switching the display mode for the cursor between the first display mode and the second display mode to the second manner for keeping the cursor displayed in the first display mode, by displaying only the first image on the display.

5. The image forming apparatus according to claim 1, wherein the controller is further configured to change the first manner to display the animation to the second manner, by extending a time interval for switching the target image to be displayed from one still image to another among the plurality of still images constituting the animation, to slow down a motion speed of the animation.

6. The image forming apparatus according to claim 5, wherein the animation is a blinking display of a cursor, wherein the plurality of still images include a first image representing the cursor turned on, and a second image representing the cursor turned off, and
wherein the controller is further configured to:
    sequentially switch the target image to be displayed between the first image and the second image at particular time intervals; and
    when the image forming apparatus is remotely connected with the information processing device, change the first manner to display the animation to the second manner by extending the particular time interval to slow down a blinking speed of the cursor.

7. The image forming apparatus according to claim 5,
wherein the animation is a cursor displayed while switching a display mode therefor between a first display mode and a second display mode,
wherein the plurality of still images include a first image representing the cursor displayed in the first display mode, and a second image representing the cursor displayed in the second display mode, and
wherein the controller is further configured to:
sequentially switch the target image to be displayed between the first image and the second image at particular time intervals; and
when the image forming apparatus is remotely connected with the information processing device, change the first manner to display the animation to the second manner by extending the particular time interval to slow down a switching speed of the cursor.

8. The image forming apparatus according to claim 5, wherein the animation is an animation representing that the image forming apparatus is performing a particular operation.

9. The image forming apparatus according to claim 3, wherein the cursor is a cursor indicating an input position where to input information or data.

10. The image forming apparatus according to claim 4, wherein the cursor is a cursor indicating an input position where to input information or data.

11. The image forming apparatus according to claim 6, wherein the cursor is a cursor indicating an input position where to input information or data.

12. The image forming apparatus according to claim 7, wherein the cursor is a cursor indicating an input position where to input information or data.

13. The image forming apparatus according to claim 1, wherein the controller is further configured to, after changing the first manner to display the animation to the second manner, transmit the remote panel data for causing the information processing device to display a same animation as the animation to be displayed in the second manner, to the information processing device via the communication interface.

14. The image forming apparatus according to claim 1, wherein the controller comprises:
a processor; and
a memory storing computer-readable instructions configured to, when executed by the processor, cause the processor to:
perform at least one of:
controlling the print engine to perform the printing and controlling the display to display the status of the printing; and
controlling the scan engine to perform the image scanning and controlling the display to display the status of the image scanning;
perform communication for providing the remote panel with the information processing device via the communication interface, thereby placing the image forming apparatus into the remote panel providing state, wherein when the image forming apparatus is in the remote panel providing state, in response to the display screen on the display being switched from the first screen to the second screen, transmit, to the information processing device, the remote panel data for causing the information processing device to display the remote panel including the second screen;
when the display screen includes the animation, sequentially switch the target image to be displayed from one still image to another among the plurality of still images constituting the animation, thereby displaying the animation on the display;
after the target image is switched from the one still image to the another still image, transmit the remote panel data to the information processing device, thereby causing the information processing device to display the remote panel including the another still image;
display the animation in the first manner, when the remote panel is not displayed on the information processing device; and
change the first manner to display the animation to the second manner different from the first manner, when the remote panel is displayed on the information processing device.

15. A method implementable on a processor of an image forming apparatus comprising at least one of a print engine and a scan engine, a communication interface, and a display, the method comprising:
performing at least one of:
controlling the print engine to perform printing and controlling the display to display a status of the printing; and
controlling the scan engine to perform image scanning and controlling the display to display a status of the image scanning;
performing communication for providing a remote panel with an information processing device via the communication interface, thereby placing the image forming apparatus into a remote panel providing state, wherein when the image forming apparatus is in the remote panel providing state, in response to a display screen on the display being switched from a first screen to a second screen, the controller transmits, to the information processing device, remote panel data for causing the information processing device to display the remote panel including the second screen;
when the display screen includes an animation, sequentially switching a target image to be displayed from one still image to another among a plurality of still images constituting the animation, thereby displaying the animation on the display;
after the target image is switched from the one still image to the another still image, transmitting the remote panel data to the information processing device, thereby causing the information processing device to display the remote panel including the another still image;
displaying the animation in a first manner, when the remote panel is not displayed on the information processing device; and
changing the first manner to display the animation to a second manner different from the first manner, when the remote panel is displayed on the information processing device.

16. A non-transitory computer-readable medium storing computer-readable instructions executable by a processor of an image forming apparatus comprising at least one of a print engine and a scan engine, a communication interface, and a display, the instructions being configured to, when executed by the processor, cause the processor to:
perform at least one of:
controlling the print engine to perform printing and controlling the display to display a status of the printing; and controlling the scan engine to perform image scanning and controlling the display to display a status of the image scanning;

perform communication for providing a remote panel with an information processing device via the communication interface, thereby placing the image forming apparatus into a remote panel providing state, wherein when the image forming apparatus is in the remote panel providing state, in response to a display screen on the display being switched from a first screen to a second screen, the controller transmits, to the information processing device, remote panel data for causing the information processing device to display the remote panel including the second screen;

when the display screen includes an animation, sequentially switch a target image to be displayed from one still image to another among a plurality of still images constituting the animation, thereby displaying the animation on the display;

after the target image is switched from the one still image to the another still image, transmit the remote panel data to the information processing device, thereby causing the information processing device to display the remote panel including the another still image;

display the animation in a first manner, when the remote panel is not displayed on the information processing device; and change the first manner to display the animation to a second manner different from the first manner, when the remote panel is displayed on the information processing device.

17. The image forming apparatus according to claim 1,
wherein the controller is further configured to, in the second manner, stop the animation by maintaining to display one of the plurality of still images constituting the animation.

18. The image forming apparatus according to claim 17,
wherein the animation is a blinking display of a cursor,
wherein the plurality of still images include a first image representing the cursor turned on, and a second image representing the cursor turned off, and
wherein the controller is further configured to, in the second manner, stop the animation by maintaining to display the first image.

19. The image forming apparatus according to claim 1,
wherein the controller is further configured to, in the second manner, sequentially switch the target image a smaller number of times for a particular period of time than in the first manner.

20. The image forming apparatus according to claim 8,
wherein the controller is further configured to display on the display the animation representing a progress status of the particular operation, by sequentially switching the target image from the one still image to the another still image among the plurality of still images constituting the animation.

* * * * *